United States Patent [19]
Okutsu et al.

[11] Patent Number: 6,064,829
[45] Date of Patent: May 16, 2000

[54] COUNTER DEVICE FOR SHEET PHOTO FILM PACK

[75] Inventors: Taro Okutsu; Yoshio Hara; Koichi Hatakeyama, all of Kanagawa, Japan

[73] Assignee: Fuji Photo Film Co., Ltd., Kanagawa, Japan

[21] Appl. No.: 09/116,657

[22] Filed: Jul. 17, 1998

[51] Int. Cl.[7] .................................................. G03B 17/24
[52] U.S. Cl. ........................ 396/284; 396/515; 396/517
[58] Field of Search ................................... 396/284, 515, 396/517

[56] References Cited

U.S. PATENT DOCUMENTS

| | | | |
|---|---|---|---|
| 5,448,324 | 9/1995 | Okano et al. | 354/277 |
| 5,710,952 | 1/1998 | Okutsu et al. | 396/518 |
| 5,745,807 | 4/1998 | Okutsu et al. | 396/284 |

*Primary Examiner*—David M. Gray
*Attorney, Agent, or Firm*—Sughrue, Mion, Zinn, Macpeak & Seas, PLLC

[57] ABSTRACT

A sheet photo film pack includes a pack housing for containing a stack of eight sheet photo film units. The counter device is used with the sheet photo film pack. A counter chamber is formed in the pack housing. A counter disk is contained in the counter chamber rotatably, and has first and second faces. A train of counter numerals are arranged on the first face in an arc-shaped manner at a predetermined pitch. Plural stepping claws are disposed on the first face to project in a thickness direction of the counter disk, arranged in an arc-shaped manner at the predetermined pitch, and rotationally shifted by an external mechanical shift signal. The shift signal is associated with each one of the sheet photo film units to be counted, and adapted to setting the counter numerals in a counter indicator window.

19 Claims, 24 Drawing Sheets

F I G. 7A
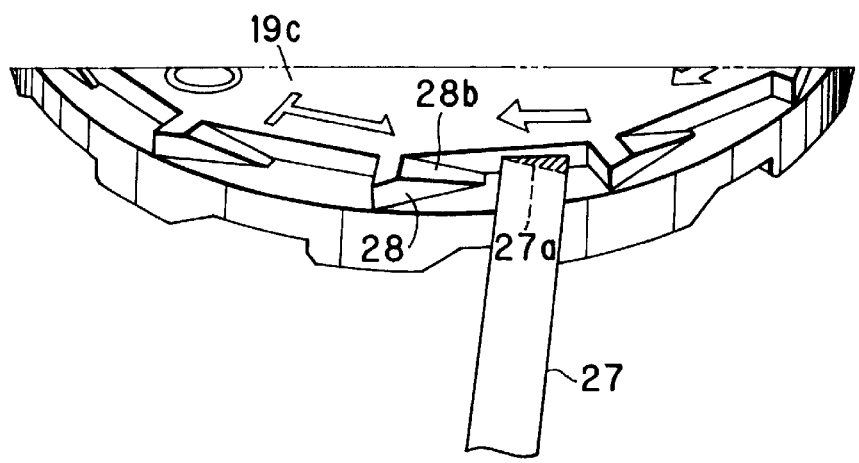
F I G. 7B
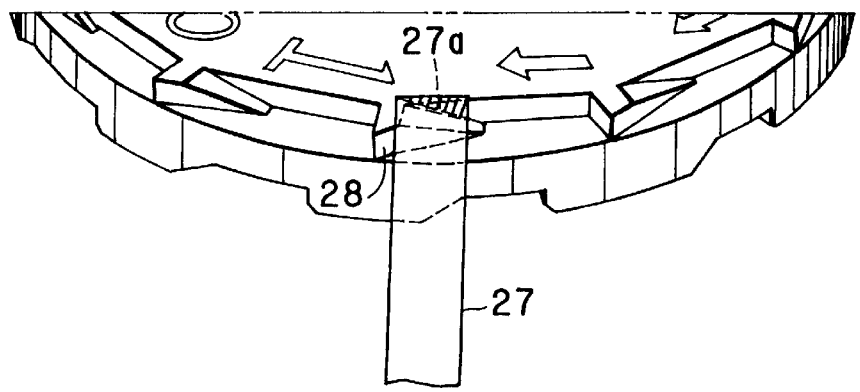
F I G. 7C
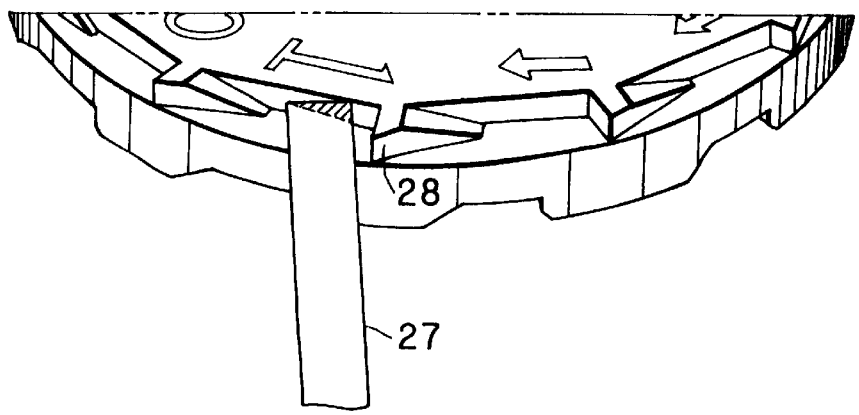

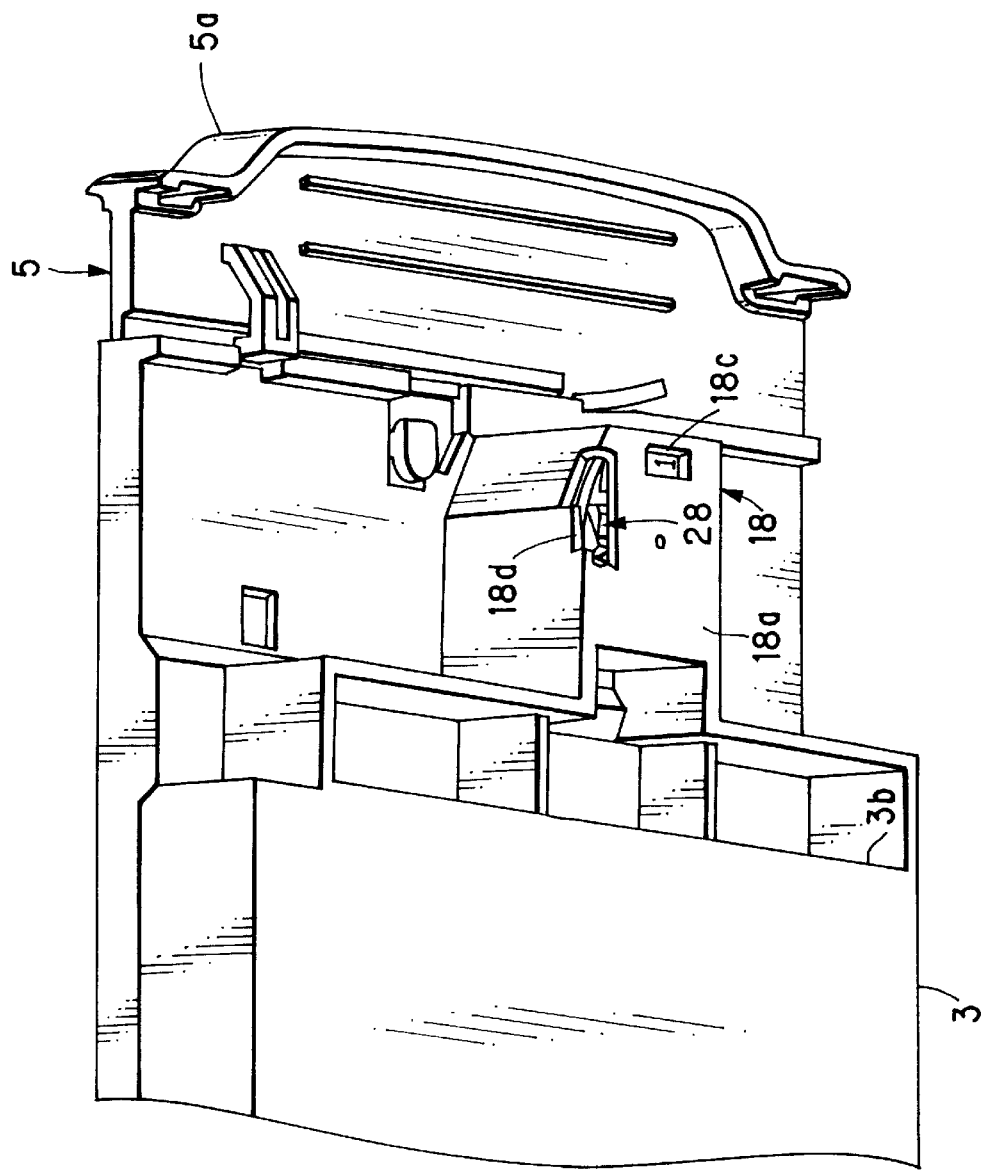

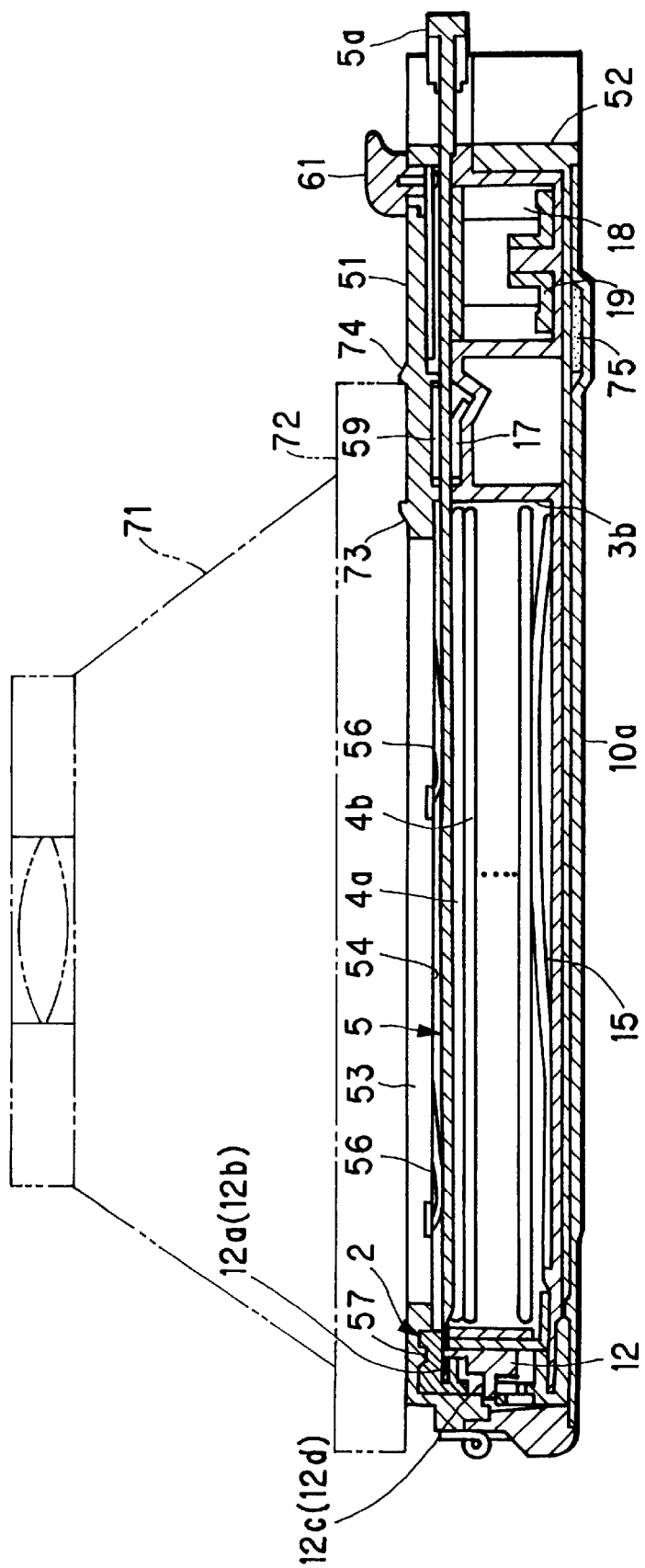

F I G. 20
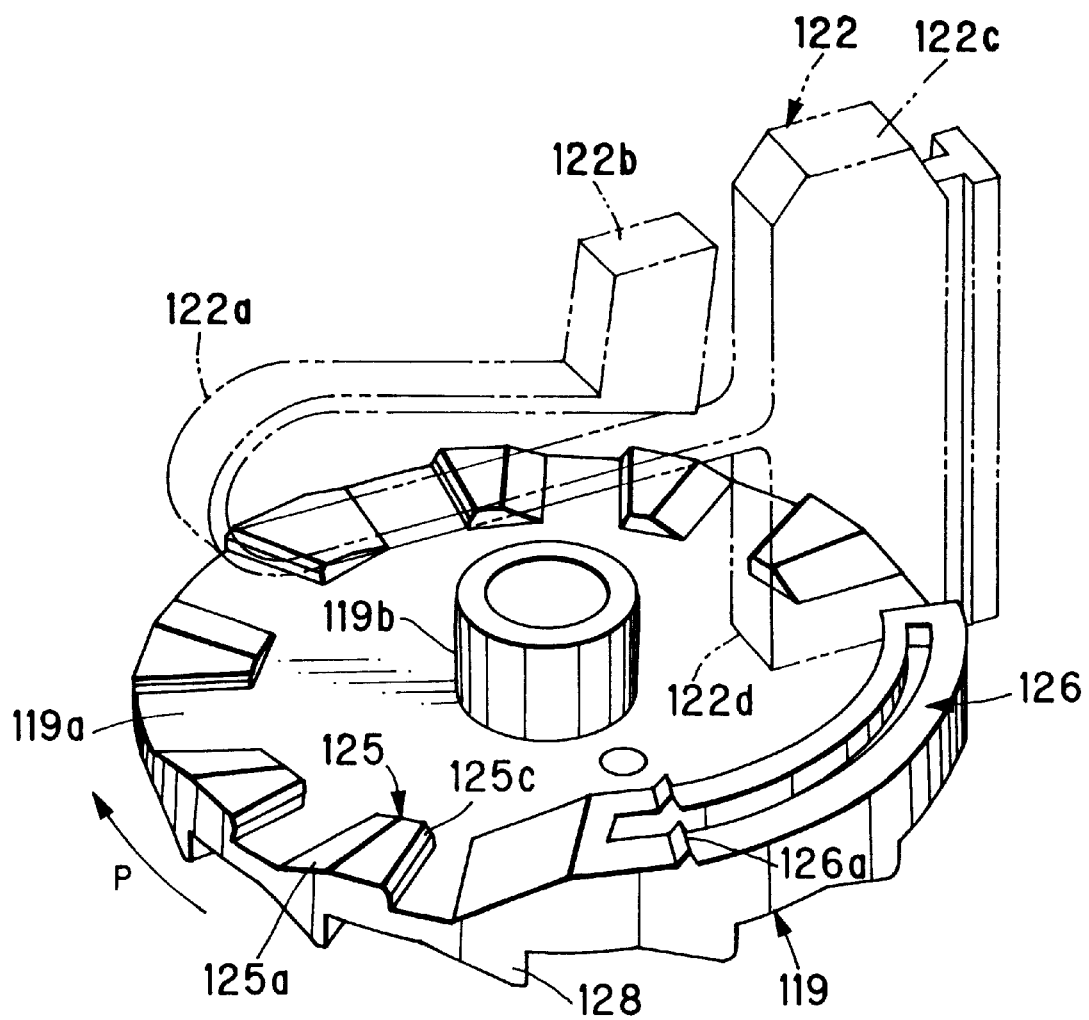

F I G. 21
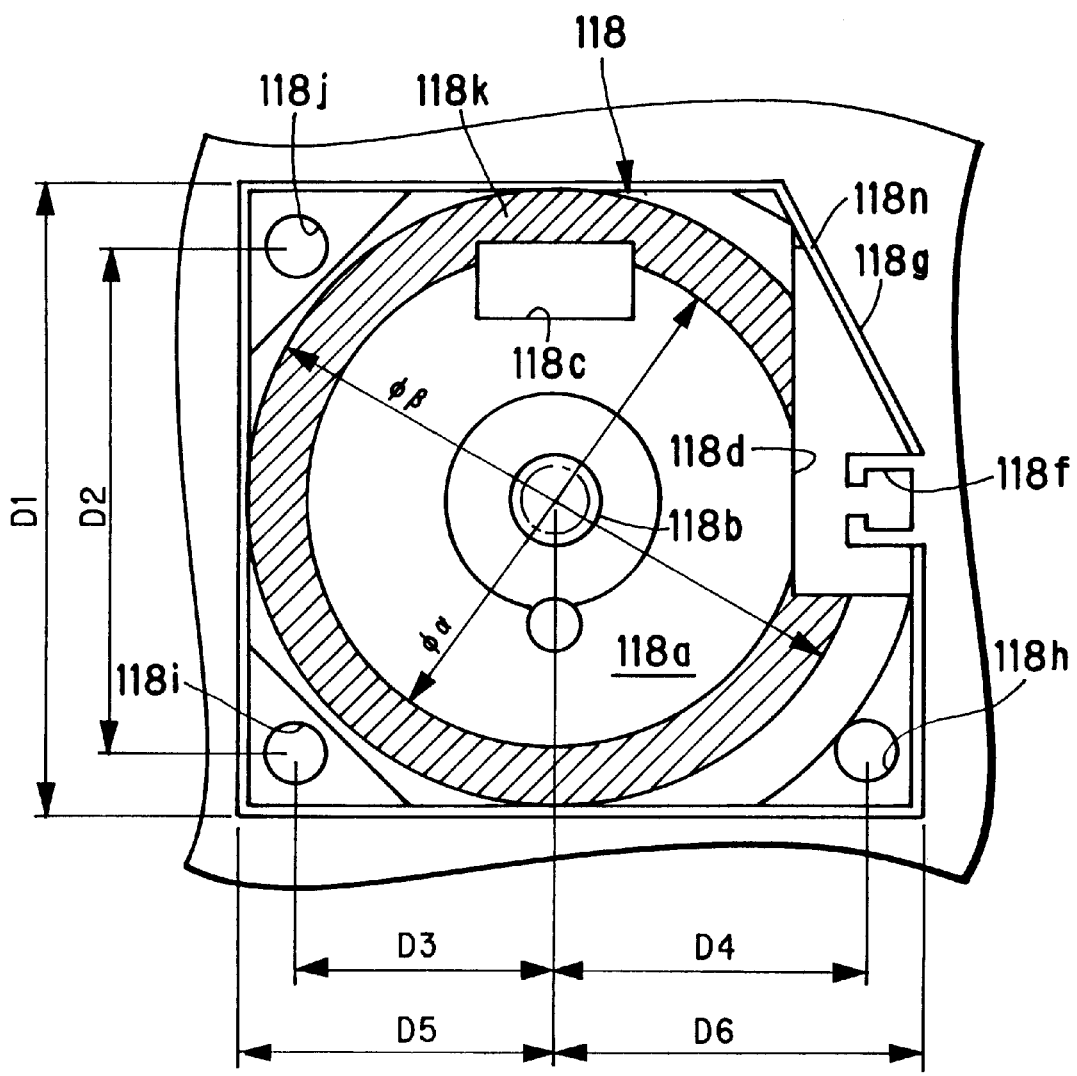

COUNTER DEVICE FOR SHEET PHOTO FILM PACK

BACKGROUND OF THE INVENTION

1. Field of the Invention

The present invention relates to a counter device for a sheet photo film pack. More particularly, the present invention relates to a counter device for a sheet photo film pack capable of properly indicating a counted number of exposures taken in combination with a camera and a pack holder.

2. Description Related to the Prior Art

A sheet photo film pack has a pack housing, which contains a stack of plural sheet photo film units. A pack holder is loaded with the sheet photo film pack. The pack holder is used in combination with a large-format camera of a frame size of 4×5 inches (102×127 mm). The pack housing has a slidable lid. The use of the pack holder makes it easy to take photographs in the large-format camera one after another, because the slidable lid is only slid back and forth before each of the sheet photo film units can be readily positioned at an exposure aperture in place of a preceding exposed one of the sheet photo film units. Each of the sheet photo film units is constituted of a sheet photo film having a size of 4×5 inches, and a plastic sheath for containing the sheet photo film for the purpose of protection.

U.S. Pat. No. 5,710,952 (corresponding to JP-A 8-110568) discloses a sheet photo film pack, in which a counter chamber is formed in the pack housing in a box shape. The counter chamber contains a rotatable counter disk, which is rotated and stepped up by a counter advance spring plate or lever of the pack holder. One face of the counter disk, where a train of counter numerals are arranged, is provided with stepping claws of a gear shape. The counter advance spring plate of the pack holder is engaged with the stepping claws, and rotates and steps the counter disk in one direction in cooperation with the stepping claws.

The counter advance spring plate or lever is produced by cutting an end of a metal thin arm obliquely, and is bent vertically. The bent end of the arm is provided with a shape of a right-angled triangle. Each time that one exposure is taken, the counter advance spring plate is rotated from its initial position, causes the counter disk to make stepwise rotation by one step, and is rotated back to its initial position to be stand by for next stepping operation. In the returning operation, the counter advance spring plate forcibly comes back to the tip of one of the stepping claws next to the present one of them, and moves past it.

Also the counter disk has plural ratchet claws for anti-reversal operation. The ratchet claws are located on a disk face reverse to that having the counter numerals. The ratchet claws are combined with a push plate to constitute a ratchet mechanism. There is a spring portion formed integrally with the push plate, which is vertically pressed against the counter disk by the bias force of the spring portion.

However failure related to the counter advance spring plate or lever is likely to cause erroneous operation of the counter disk. Examples of the failure include burrs created with the claw drive end with low precision at the time of cutting out the counter advance spring plate, failure in precisely bending the counter advance spring plate, and failure in precisely positioning the counter advance spring plate. In the returning movement, it is likely that the counter advance spring plate does not move past one of the stepping claws next to one of them engaged with the counter advance spring plate. Backward push of the counter advance spring plate occurs to the one stepping claw. For example, the counter disk rotates in reverse by half a step. In the next stepping operation of the counter device, the counter advance spring plate pushes again the same one of the stepping claws. Accordingly there occurs a difference between an indicated counter numeral and the number of the actually exposed sheet photo film units. When all the sheet photo film units are exposed finally, the pack is erroneously enabled to take another exposure. The first exposed one of the sheet photo film units is exposed again as a double exposure.

It is also likely that the counter disk does not make enough rotation of a predetermined angle for various causes, including insufficiency in the swinging angle of the counter advance spring plate or lever due to failure in assembly of the counter advance spring plate, and errors in molding the pack housing. At this time of the insufficient rotation, the push plate remains in contact with the tip of the ratchet claws, and does not operate for preventing the reverse rotation. This is included in the causes of the above-described half-step reversal in rotation of the counter disk.

In the above-described push plate, the bias force of the spring portion is lowered with time, for example after preservation for a long time. There occurs failure in correct stepping in the counter device. If the sheet photo film pack is dropped forcibly or shocked considerably in any manner, the indicated counter numeral is likely to change as the counter disk may come to an unwanted position.

There is an adequate clearance between a slidable tray and the inside of the pack housing for the purpose of convenience in loading the pack housing. A problem lies in that the stepping of the counter device is unstable because the clearance involves a changeable relation in the distance between the counter disk and the counter advance spring plate or lever. Should the distance be too great, the counter advance spring plate is likely not to be engaged with the counter disk. The counter advance spring plate may swing without driving the counter disk, so that the counter device may not be stepped properly. Should the distance be too small, the counter advance spring plate may come to too deep a position between the stepping claws of the counter disk. In the return operation of the counter advance spring plate, the counter advance spring plate may be caught by the stepping claws, and may rotate back the counter disk in the manner of "back-stepping" of the counter device.

SUMMARY OF THE INVENTION

In view of the foregoing problems, an object of the present invention is to provide a counter device for a sheet photo film pack, capable of being stepped even in occurrence of various kinds of failure related to the counter advance spring plate or lever.

Another object of the present invention is to provide a counter device for a sheet photo film pack, capable of being stepped properly even after a long time, and free from influence of external shock in relation to the counter stepped position.

Still another object of the present invention is to provide a counter device for a sheet photo film pack, in which play between the inside of the pack housing and the slidable tray of the pack holder can be reduced, to stabilize the counter operation.

In order to achieve the above and other objects and advantages of this invention, a counter device is used in a sheet photo film pack, which includes a pack housing for containing a stack of plural sheet photo film units. The counter device includes a counter chamber formed in the pack housing. A counter disk is contained in the counter chamber in a rotatable manner, and has first and second faces. A train of counter numerals are arranged on the first face in an arc-shaped manner at a predetermined pitch. Plural stepping claws are disposed on the first face to project in a thickness direction of the counter disk, arranged in an arc-shaped manner at the predetermined pitch, and rotationally shifted by an external mechanical shift signal in a predetermined stepping direction, the shift signal being associated with each one of the sheet photo film units to be counted, and adapted to setting the counter numerals in a predetermined index position.

A guide inclined surface is formed on each one of the stepping claws, positioned thereon in the stepping direction, and inclined with reference to the thickness direction of the counter disk.

An erect surface is formed on each one of the stepping claws, positioned thereon backwards to the stepping direction, erect in the thickness direction of the counter disk, and pushed in the stepping direction by an external counter advance mechanism, for receiving the shift signal. The guide inclined surface allows the counter advance mechanism to slip from the stepping claws in reverse to the stepping direction.

The sheet photo film pack is used with a pack holder, and the pack holder includes a holder housing for containing the sheet photo film pack. Also the pack holder includes the counter advance mechanism, disposed in the holder housing, engageable with the stepping claws by confrontation therewith in the thickness direction of the counter disk, and actuated in response to an operation associated with use of each one of the sheet photo film units, for generating the shift signal.

Consequently the counter device is capable of being stepped even in occurrence of various kinds of failure related to the counter advance spring plate or lever.

A ratchet mechanism prevents the counter disk from rotating in reverse to the stepping direction when the counter numerals are set in the index position.

The ratchet mechanism includes plural ratchet claws, disposed on the second face to project from the counter disk, and arranged in an arc-shaped manner at the predetermined pitch. A push plate is disposed in the counter chamber in a movable manner, confronted with the second face, for blocking rotation of the ratchet claws in reverse to the stepping direction.

An additional inclined surface is formed on each one of the stepping claws, and inclined to decrease a radius of the stepping claws in the stepping direction, the radius being defined with reference to a center of the counter disk.

In a preferred embodiment, the sheet photo film pack further includes an engaging portion, disposed on the pack housing, and shaped in an asymmetrical manner with respect to a center line of the pack housing. The pack holder includes a slidable tray, disposed in a manner slidable into and out of the holder housing, for containing the sheet photo film pack. A receiving portion is disposed in the slidable tray, engaged with the engaging portion, for positioning the sheet photo film pack in the slidable tray, to tighten engagement between the counter disk and the counter advance mechanism.

Consequently the play between the inside of the pack housing and the slidable tray of the pack holder can be reduced, to stabilize the counter operation.

In the counter device, an access opening is formed through a bottom wall of the counter chamber confronted with the first face, and adapted to engagement between the stepping claws and the counter advance mechanism therethrough.

The pack holder further includes a slidable tray, mounted in the holder housing, for the sheet photo film pack, the slidable tray being slid in a first direction to come out of the holder housing, and slid in a second direction to come into the holder housing. An exposure opening is formed in the holder housing, for receiving an exposure surface of a first one of the plural sheet photo film units, the exposure opening being adapted to exposure of the first sheet photo film unit. A shifter mechanism shifts the first sheet photo film unit away from the exposure opening in response to a slide of the slidable tray and the sheet photo film pack in the first direction after the exposure, then the slidable tray and the sheet photo film pack being slid in the second direction, the exposure opening receiving a second one of the plural sheet photo film units next to the first sheet photo film unit. The counter advance mechanism applies the shift signal to the counter disk in the sheet photo film pack in response to a back-and-forth slide of the slidable tray and the sheet photo film pack.

In still another preferred embodiment, a ratchet erect surface is formed on each one of the ratchet claws, positioned thereon backwards to the stepping direction, erect in the thickness direction of the counter disk. An auxiliary inclined surface is formed on each one of the ratchet claws by chamfering an edge of the ratchet erect surface, for guiding movement of the push plate toward the ratchet erect surface during rotation of the counter disk in the stepping direction.

An inclined surface is formed on each one of the ratchet claws, positioned thereon in the stepping direction, inclined with reference to the thickness direction of the counter disk, for slipping from the push plate while rotated in the stepping direction.

In a further preferred embodiment, a metal spring presses the push plate against the second face.

Consequently the counter device is capable of being stepped properly even after a long time, and free from influence of external shock in relation to the counter stepped position.

In still another preferred embodiment, a ring-shaped groove is formed in a bottom wall of the counter chamber confronted with the first face, for receiving the stepping claws.

A numeral indication portion is disposed on the first face, and having the counter numerals arranged thereon. A peripheral portion is disposed about the numeral indication portion on the first face, formed to retreat from the numeral indication portion in the thickness direction, and having the stepping claws arranged thereon. The stepping claws have a top point erect in the thickness direction, and the top point projects over the numeral indication portion.

Consequently the tightness in engagement of the counter disk claws with the advance spring plate or lever is increased.

BRIEF DESCRIPTION OF THE DRAWINGS

The above objects and advantages of the present invention will become more apparent from the following detailed description when read in connection with the accompanying drawings, in which:

FIG. 7A is an explanatory view illustrating an initial position in which the counter advance spring plate or lever lies;

FIG. 7B is an explanatory view illustrating a state where the counter advance spring plate is moving to a ready position;

FIG. 7C is an explanatory view illustrating the ready position in which the counter advance spring plate lies for stepping up the counter device;

FIG. 8 is a bottom perspective, partially cutaway, illustrating the counter device of the sheet photo film pack;

FIG. 10 is a vertical section illustrating a state where the pack holder at a camera is initially supplied with the sheet photo film pack;

FIG. 20 is a bottom perspective illustrating the counter disk;

FIG. 21 is an explanatory view in bottom plan, illustrating a counter chamber;

DETAILED DESCRIPTION OF THE PREFERRED EMBODIMENTS OF THE PRESENT INVENTION

Figure 1:
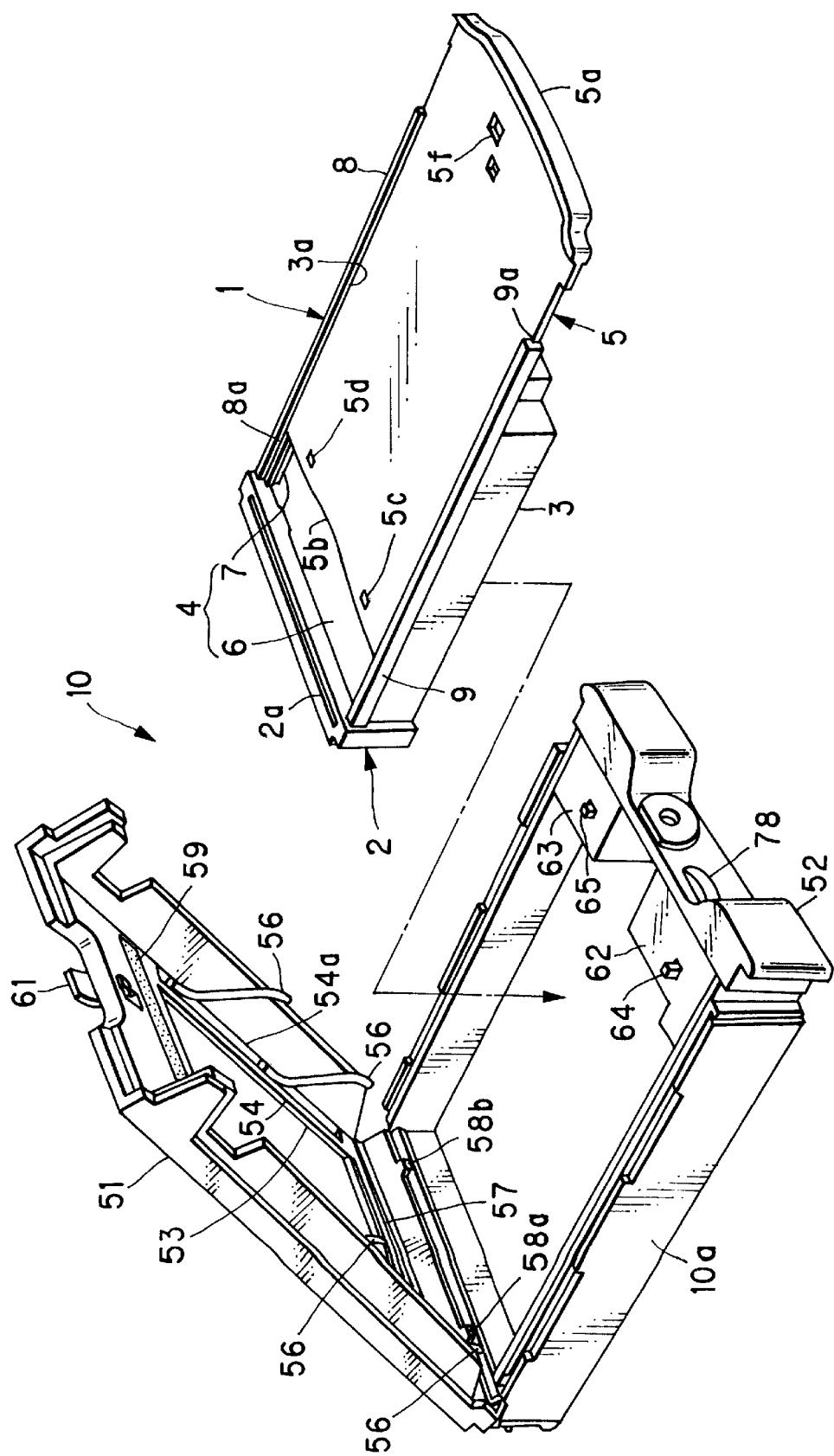
FIG. 1 is a perspective illustrating a sheet photo film pack and a pack holder.

In FIG. 1, a sheet photo film pack 1 incorporates a counter mechanism of the present invention. The sheet photo film pack 1 is constituted of a pack housing 3 and a slidable lid 5. The pack housing 3 has a box shape. A cap 2 is fitted on an end of the pack housing 3 in a removable manner. A stack of eight sheet photo film units 4 are contained in the pack housing 3. The slidable lid 5 is mounted on the pack housing 3 in a manner slidable to open/close an opening 3a in the pack housing 3. The slidable lid 5 includes a grip 5a. Each of the sheet photo film units 4 is constituted of a sheet photo film 6 having a size of 4×5 inches (102×127 mm), and a plastic sheath 7 for containing the sheet photo film 6.

Figure 2:
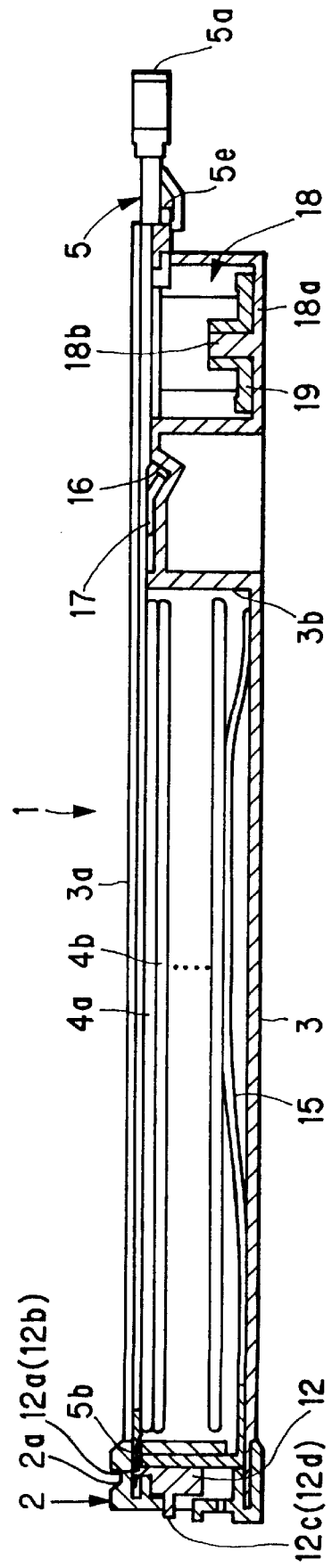
FIG. 2 is a vertical section illustrating the sheet photo film pack.

The slidable lid 5 has a size larger than the sheet photo film units 4, and slider when pushed or pulled by a user's hand holding the grip 5a. The slidable lid 5 is slidable in a direction of grooves 8a and 9a in guide rails 8 and 9 formed in edges of the pack housing 3. In FIG. 2, the sheet photo film pack 1 before being loaded in a pack holder 10 is depicted. Retainer holes 5c and 5d formed in an advancing edge 5b of the slidable lid 5 are engaged with claws 12a and 12b, which are formed with a fastener 12 of the cap 2. A ridge 5e is disposed near to the grip 5a, and contacts an end of the pack housing 3 to keep it in a position of closing the opening 3a.

A pressure plate spring 15 is disposed on a bottom of a photo film chamber 3b where the sheet photo film units 4 are contained in the stacked manner. The pressure plate spring 15 biases the sheet photo film units 4 toward the opening 3a. A groove 16 is formed in a V-shape as viewed in section, and extends vertically to the sliding direction of the slidable lid 5 on the pack housing 3 near to the photo film chamber 3b. Light-trap fabric 17 is fixed in the groove 16. There is a box-shaped counter chamber 18 in the pack housing 3 near to the grip 5a, and contains a counter disk 19. The counter disk 19 is rotatable in the counter chamber 18 about a shaft 18b, which is formed integrally with a bottom wall 18a.

Figure 3:
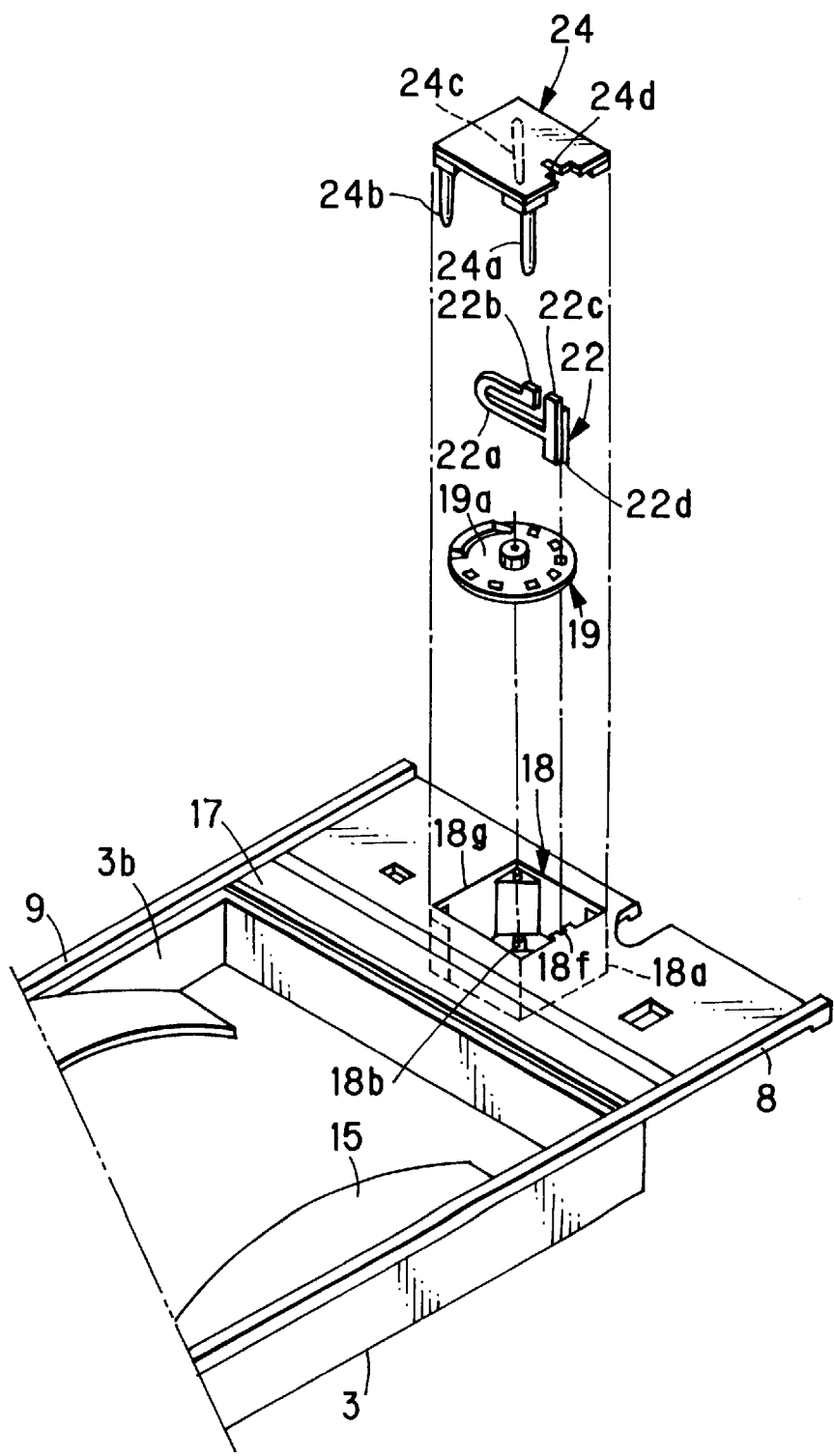
FIG. 3 is an exploded perspective illustrating the sheet photo film pack with its counter device as viewed from the bottom.

In FIG. 3, a push plate 22 included in a ratchet mechanism is inserted in a guide groove 18f in the counter chamber 18, and covers the counter disk 19. The push plate 22 includes a spring portion 22a constituting a bias mechanism. Then a cover plate 24 is fitted to close an open face 18g of the counter chamber 18 to cover the push plate 22. The cover plate 24 has three projections 24a, 24b and 24c at its corners. The projections 24a, 24b and 24c are received by holes formed in a bottom wall of the counter chamber 18 at its corners, to secure the cover plate 24 to the counter chamber 18 fixedly.

Figure 4:
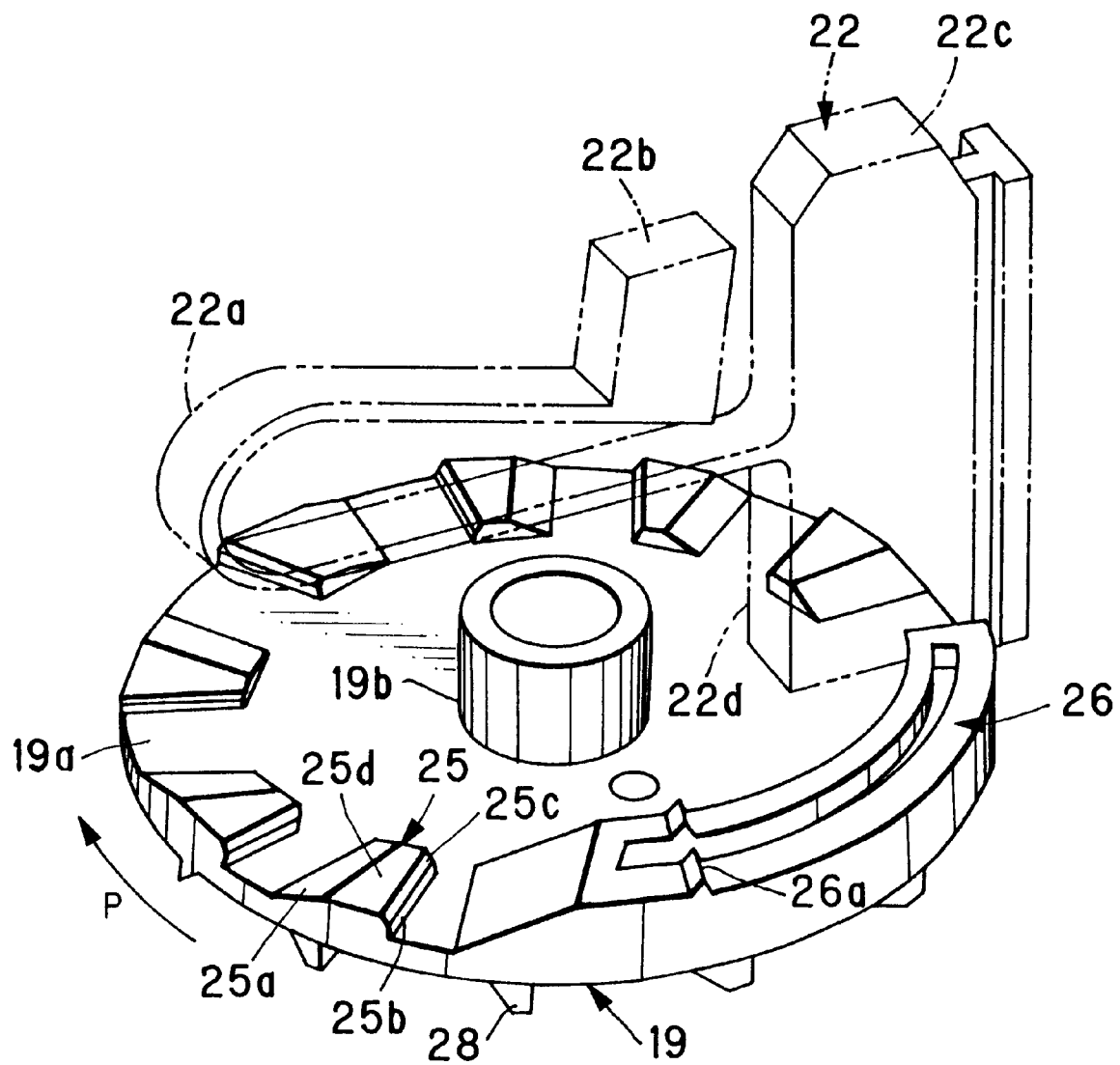
FIG. 4 is a bottom perspective illustrating a counter disk combined with a push plate.

As a bias end 22b of the push plate 22 is regulated by the inside of the cover plate 24, a bottom end 22d of the push plate 22 is kept in contact with a second face 19a of the counter disk 19. See FIG. 4. The push plate 22 constitutes the ratchet mechanism in combination with seven ratchet claws 25 or anti-reversal teeth and a ratchet claw 26 or tooth. The ratchet claw 26 has a greater height and a greater length than that of the ratchet claws 25. The combination of the counter disk 19 and the push plate 22 constitutes the counter device. There is a sleeve 19b, which is formed on the second face 19a, and receives insertion of the shaft 18b.

Figure 5:
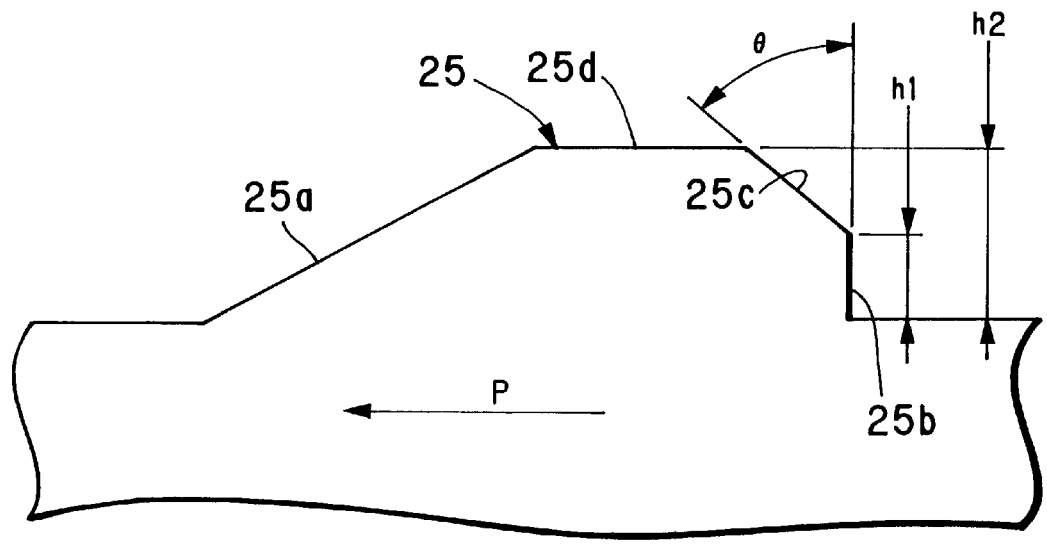
FIG. 5 is an explanatory view illustrating a ratchet claw of the counter disk.
Figure 9:
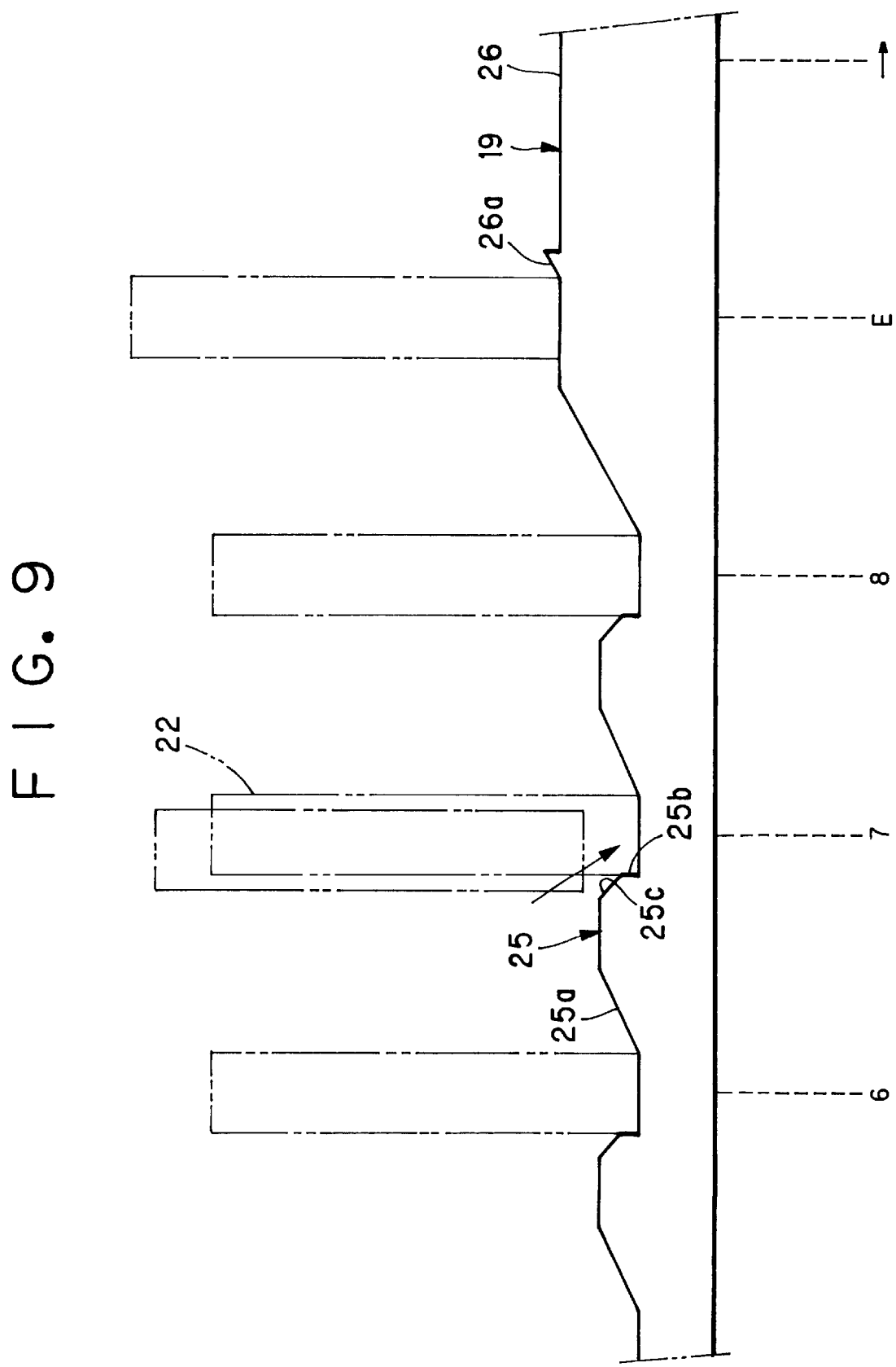
FIG. 9 is an explanatory view illustrating a relationship between the ratchet claws and the push plate.

In FIG. 5, one of the ratchet claws 25 is viewed from the periphery of the counter disk 19. The ratchet claws 25 include an inclined surface 25a with a small inclination, a ratchet erect surface 25b and an auxiliary inclined surface 25c. The inclined surface 25a is rotationally positioned in the stepping direction P of the counter disk 19 indicated by the arrow. The inclined surface 25a has the inclination ready to move to the bottom of the bottom end 22d of the push plate 22. The ratchet erect surface 25b and the auxiliary inclined surface 25c are positioned back with reference to the stepping direction P. The ratchet erect surface 25b operates for preventing rotation in reverse. The auxiliary inclined surface 25c is chambered, and guides the push plate 22 to a drop position between the ratchet claws 25. The auxiliary inclined surface 25c makes it possible to guide the push plate 22 to a predetermined drop position readily even when a counter advance spring plate or lever is insufficiently swung. A rotational angle of the counter disk 19 can be kept regular. See FIG. 9. Note that a flat top 25d is formed between the ratchet inclined surface 25a and the auxiliary inclined surface 25c.

If the height h1 of the ratchet erect surface 25b is great, the reversal preventing effect is increased. However the stop position of the push plate 22 is instable. If in turn the height h1 of the ratchet erect surface 25b is small, the stop position of the push plate 22 is stable. But the reversal preventing effected is decreased. Experiments were conducted in these respects, to obtain the results of TABLE 1. In the table, a sign A represents "Excellent", B represents "Good", C represents "Usable", D represents "Unreliable and requiring a change" and E represents "Unusable".

TABLE 1

| Height h1 of erect surface 25b | Reversal preventing effect | Precision in stop positions |
|---|---|---|
| 0.0 mm | E | A |
| 0.05 mm | D | A |
| 0.1 mm | C | A |
| 0.2 mm | B | B |
| 0.3 mm | B | B |
| 0.4 mm | B | B |
| 0.5 mm | A | C |
| 0.55 mm | A | D |
| 0.6 mm | A | E |

In conclusion of observing the results of TABLE 1, the height h1 of the ratchet erect surface 25b is in a preferable range of 0.1–0.5 mm, and in a desirable range of 0.2–0.4 mm. In the present embodiment, h1=0.3 mm. A whole height h2 of the ratchet claws 25 is 0.6 mm. An inclination angle θ of the auxiliary inclined surface 25c is 50 degrees.

Figure 6:
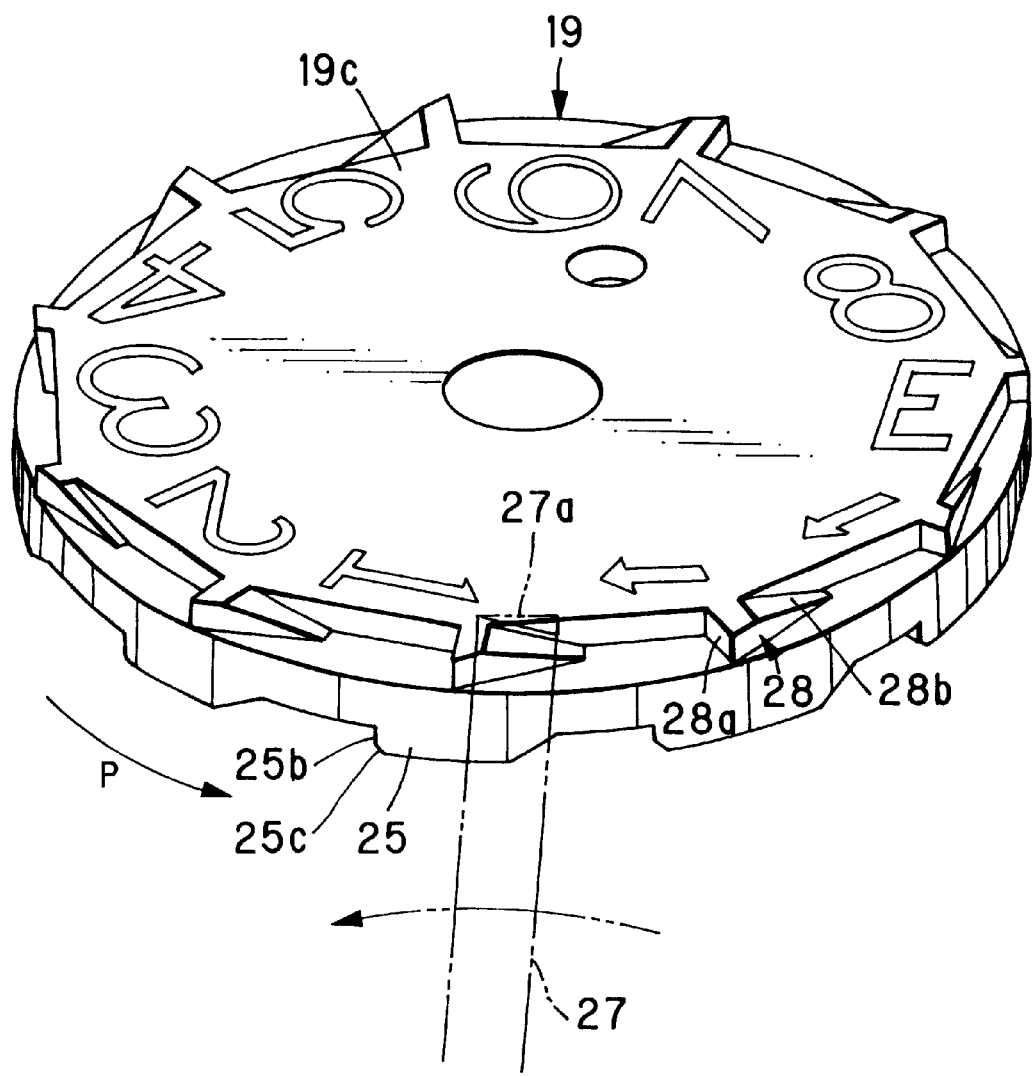
FIG. 6 is a perspective illustrating the counter disk.

In FIG. 6, a first face 19c of the counter disk 19 has counter numerals 1, 2, 3, . . . , 8 to indicate the number of the exposed sheet photo film units. The first face 19c also has an end sign E to indicate the finish of all exposures. Around the counter disk 19 are formed eleven stepping claws 28 or teeth. The stepping claws 28 are engageable with a counter advance spring plate or lever 27 of the pack holder 10 having a claw.

The stepping claws 28 include an erect surface 28a and a guide inclined surface 28b. The erect surface 28a is pressed by the counter advance spring plate or lever 27. The guide inclined surface 28b is inclined with respect to the thickness direction of the counter disk 19. The guide inclined surface 28b has a level lowered in the stepping direction P. The counter advance spring plate 27 is produced by cutting an end of an arm obliquely, and is bent vertically. A claw end 27a with the claw has a shape of a right-angled triangle.

Each time that the slidable lid 5 is moved back and forth after taking an exposure, the counter advance spring plate 27 of the pack holder 10 is swung. The claw end 27a pushes the erect surface 28 a to step up the counter disk 19 by one step. In FIG. 7, an inclined end of the claw end 27a moves along the guide inclined surface 28b and past the stepping claws 28 easily in the course of the return of the counter advance spring plate 27 to its initial position. Delay in the counting operation and double exposure are avoided, because the counter advance spring plate 27 does not push the stepping claws 28 in reverse to the stepping direction.

In FIG. 8, a counter indicator window 18c is formed in the bottom wall 18a of the counter chamber 18 close to the grip 5a for indicating the counter numerals and the end sign E. Also an access opening 18d is formed in the bottom wall 18a to receive the counter advance spring plate or lever 27.

When the push plate 22 is positioned between adjacent two of the ratchet claws 25 or between the ratchet claw 26 and the ratchet claws 25, one of the counter numerals 1–8 is indicated in the counter indicator window 18c. See FIG. 9. When the push plate 22 comes to the top of the ratchet claw 26 and contacts a projection 26a, the end sign E is indicated in the counter indicator window 18c.

The pack holder 10 for use with the sheet photo film pack 1 is depicted in FIG. 1. The pack holder 10 is constituted by a holder housing 10a, a housing cover 51 and a slidable tray 52 or carriage frame. The housing cover 51 is pivotally mounted on the holder housing 10a. The slidable tray 52 is slidable into or out of the holder housing 10a. There is an exposure opening 53 formed in the housing cover 51. The exposure opening 53 has a size smaller than the sheet photo film units 4.

The rear of the housing cover 51 has a receiving face 54, which receives the top face of the sheet photo film unit 4 to set the sheet photo film unit 4 fixedly on an exposure position. A pair of slots 54a are formed in the receiving face 54 and extend in its longitudinal direction. There are shifter springs 56 of which one end is secured to the inside of the slots 54a. Each of the slots 54a is associated with two of the shifter springs 56. The shifter springs 56 push the pack housing 3 in the downward direction when the housing cover 51 is closed after the pack holder 10 is loaded with the sheet photo film pack 1. Also the shifter springs 56 push the first one of the sheet photo film units 4 positioned in the exposure station.

A ridge 57 is located on the housing cover 51 near to its hinge, and engageable with a groove 2a in the cap 2 when the sheet photo film pack 1 is loaded, to retain the cap 2 to the inside of the holder housing 10a. Also projections 58a and 58b are disposed on the housing cover 51, and adapted to push down projections 12c and 12d of the fastener 12 to separate the claws 12a and 12b from the retainer holes 5c and 5d in the slidable lid 5. For the projections 12c and 12d, see FIG. 2. Light-trap fabric 59 is fixedly secured to the inside of the housing cover 51 and near to a shorter side of the exposure opening 53, and prevents ambient light from entry through a gap between the inside of the housing cover 51 and the slidable lid 5. A knob 61 or tab is disposed slidably on the upside of the housing cover 51, and operable to remove the sheet photo film pack 1 from the holder housing 10a.

Box-shaped chambers 62 and 63 are disposed on corners of the slidable tray 52, and incorporate mechanisms, including one for controlling a slide of the slidable tray 52 on the holder housing 10a, and another for stepping the counter disk 19. There are claws 64 and 65 protruded over upper walls of the chambers 62 and 63 through openings in them. The claws 64 and 65, when the opening 3a is fully opened, are engaged with the retainer holes 5c and 5d, to limit a range within which the slidable lid 5 is drawable.

Figure 9A:
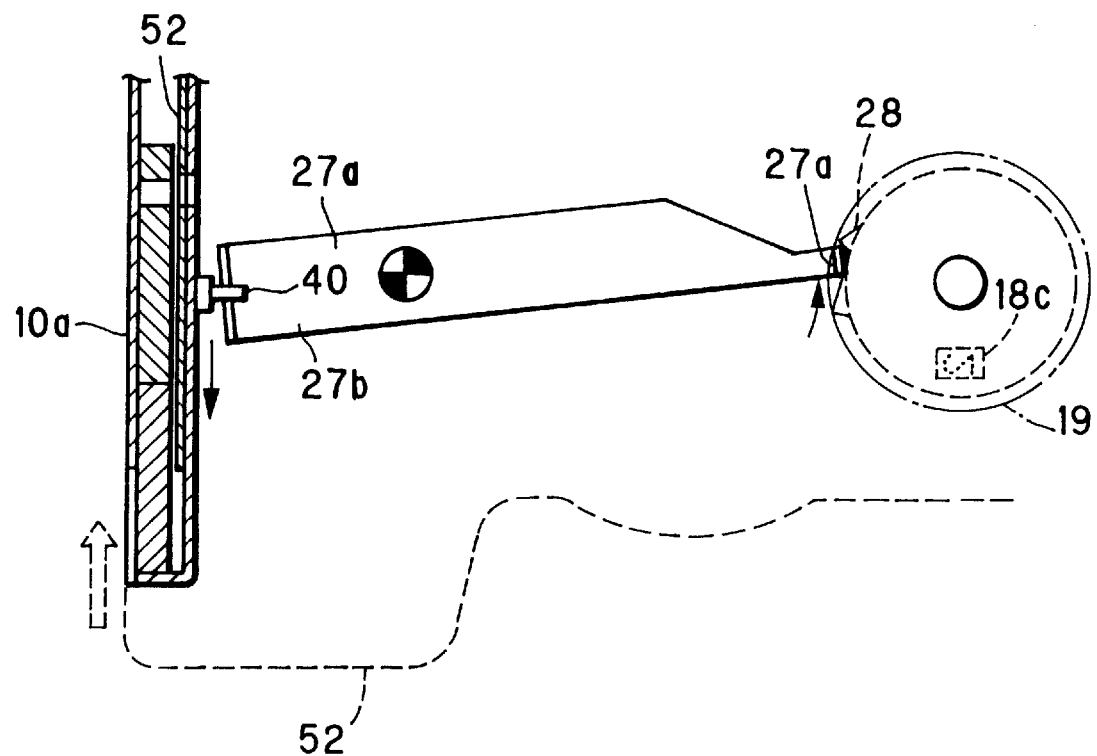
FIG. 9A is an explanatory view illustrating a counter advance spring plate combined with the counter disk.

Referring to FIG. 9A, the counter advance spring plate or lever 27 is moved from an initial position to a ready position in response to a slide of the slidable tray 52 and the sheet photo film pack 1 in a first direction, and is moved from the ready position to the initial position to output a mechanical shift signal in response to a slide of the slidable tray 52 and the sheet photo film pack 1 in a second direction. To be precise, the counter advance spring plate 27 is associated with a pin 40, disposed in the holder housing 10a, for moving in response to the slide of the slidable tray 52 and the sheet photo film pack 1 in the second direction. The counter advance spring plate 27 has a driven end 27b and the claw end 27a. The driven end 27b is engaged with the pin 40. The claw end 27a is engaged with the stepping claws 28. The counter advance spring plate 27 rotates in response to movement of the pin 40, so that the claw end 27a outputs the shift signal. This mechanical structure is similar to that disclosed in U.S. Pat. No. 5,448,324.

In FIG. 10, the top of the housing cover 51 includes ridges 73 and 74, which fixedly set the pack holder 10 on an exposure aperture 72 of a large-format camera 71. There is a light-trap fabric 75, which avoids entry of ambient light through a gap between an inner wall of the holder housing 10a and a sliding surface of the slidable tray 52.

When the housing cover 51 is closed after inserting the sheet photo film pack 1 into the holder housing 10a of the pack holder 10, the ridge 57 becomes engaged with the groove 2a of the cap 2, to hold the cap 2 in the holder housing 10a. The projections 58a and 58b contact the projections 12c and 12d to push down the fastener 12. The claws 12a and 12b are disengaged from the retainer holes 5c and 5d of the slidable lid 5, to unlock the slidable lid 5.

Figure 11:
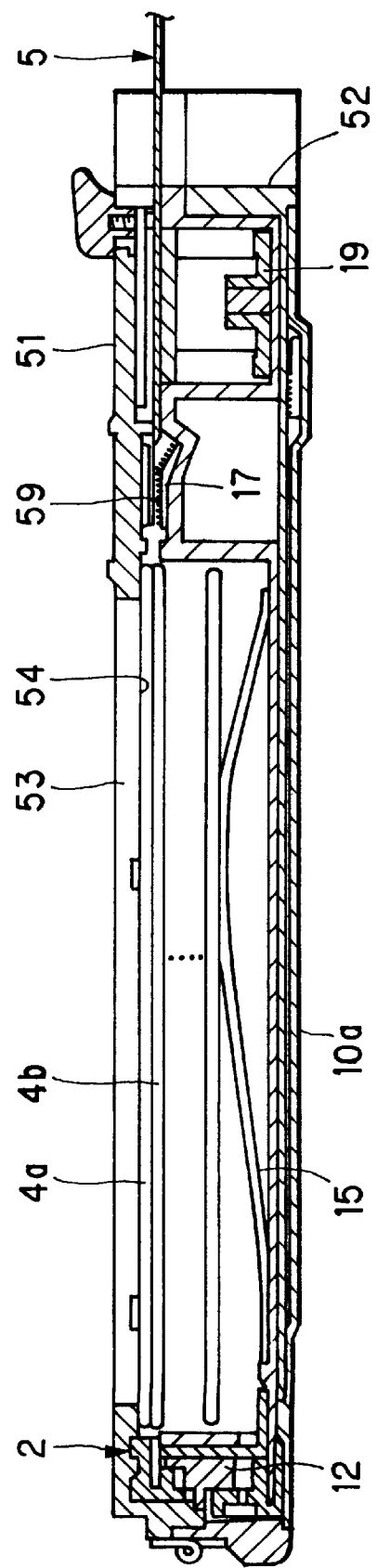
FIG. 11 is a vertical section, partially cutaway, illustrating a state where a slidable lid of the sheet photo film pack is pulled out.

After the pack holder 10 is mounted on the exposure aperture 72 of the large-format camera 71, the grip 5a is manually grasped to pull the slidable lid 5 to the position of FIG. 11. The slidable lid 5 in this state is kept by the claws 64 and 65 from being pulled further. The opening 3a of the pack housing 3 is entirely opened. A first sheet photo film unit 4a is passed through the opening 3a by the bias force of the pressure plate spring 15, contacts the receiving face 54, and is set in the exposure position. A latch mechanism incorporated in the chamber 62 retains the slidable tray 52 in the holder housing 10a. The slidable tray 52 is not slid even when the slidable lid 5 is pulled out.

Figure 12:
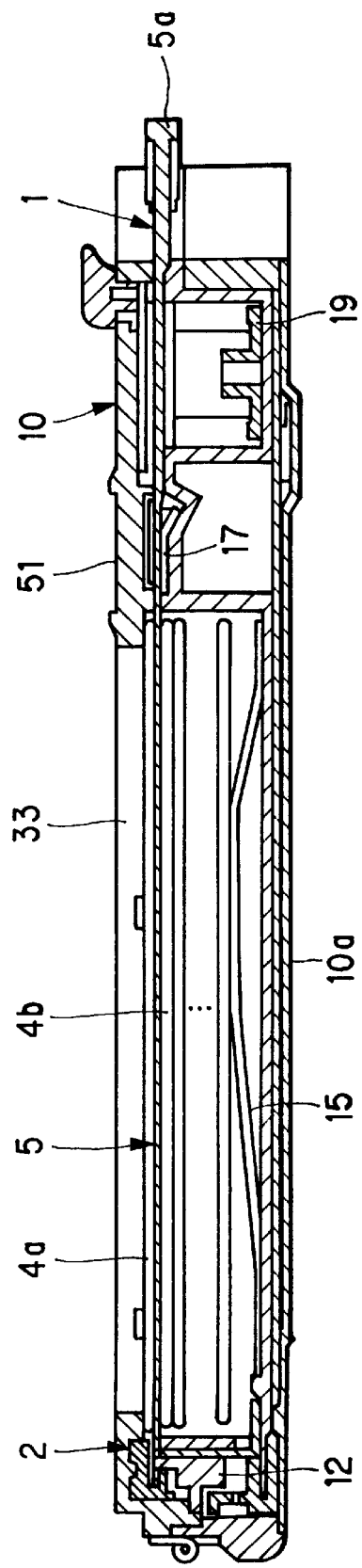
FIG. 12 is a vertical section illustrating a state where the slidable lid is pushed back to position a first sheet photo film unit.

Then the slidable lid 5 is slid back to the initial position. In FIG. 12, the slidable lid 5 is moved to a position between the first sheet photo film unit 4a and a second sheet photo film unit 4b, so that the slidable lid 5 keeps the first sheet photo film unit 4a flat on the exposure station. The latch mechanism inside the chamber 62 retains the slidable lid 5 on the slidable tray 52. The slidable tray 52 is disengaged from the holder housing 10a. Also an indication of the ready state for an exposure appears in an arc-shaped projection 78 observable to a user. See FIG. 1. A shutter device of the large-format camera 71 is operated to take an exposure to the first sheet photo film unit 4a.

Figure 13:
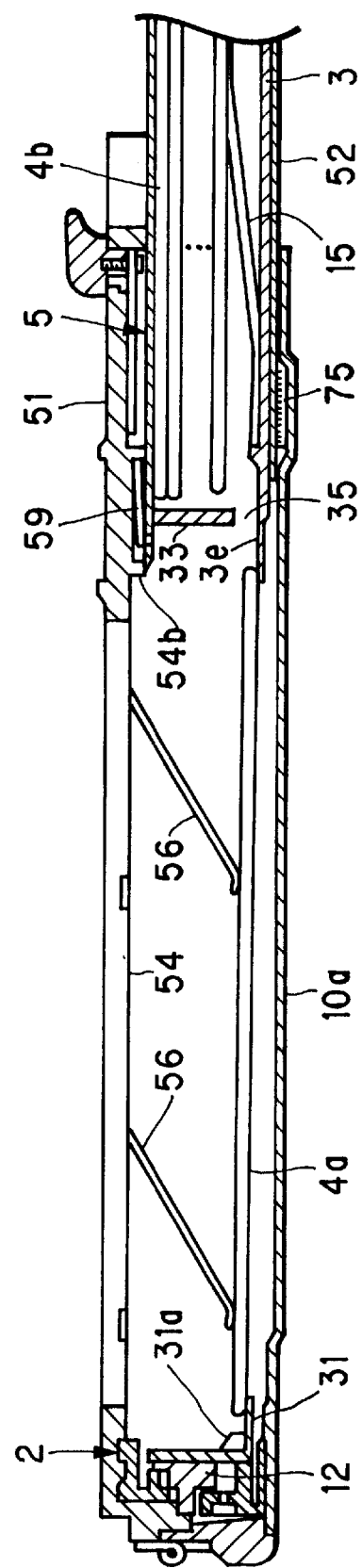
FIG. 13 is a vertical section, partially cutaway, illustrating a state where the sheet photo film pack is pulled out after the first sheet photo film unit is exposed.

After taking one exposure, the grip 5a is grasped and pulled. In FIG. 13, the slidable tray 52 and the sheet photo film pack 1 are slid together out of the holder housing 10a. Only the cap 2 remains in its innermost position in the holder housing 10a. An edge 54b of the receiving face 54 keeps the first sheet photo film unit 4 a positioned. The first sheet photo film unit 4a is therefore removed from the pack housing 3 by relative movement between the receiving face 54 and the upside of the slidable lid 5.

The first sheet photo film unit 4a removed from the pack housing 3 is pushed by the shifter springs 56 toward the bottom surface of the holder housing 10a. A mechanism (not shown) for regulating the slidable tray operates to prevent the slidable tray 52 from being further drawn. As the slidable lid 5 is closing the opening 3a of the pack housing 3, no ambient light impinges on the sheet photo film unit 4 in the pack housing 3 even while the sheet photo film pack 1 is pulled out of the pack holder 10.

In the course of insertion of the sheet photo film pack 1 and the slidable tray 52 into the holder housing 10a, the first sheet photo film unit 4a enters the pack housing 3 by movement through a reinsertion mouth 35, which is a gap defined between a partition plate 33 and an advancing edge 3e of the pack housing 3. The rear end of the first sheet photo film unit 4a is being regulated by a ridge 31a of a sheath receiver 31. Then the first sheet photo film unit 4a comes to overlie on the pressure plate spring 15, and to a position under the lowest one of the sheet photo film units 4 which are still unexposed.

Upon the finish of the insertion of the sheet photo film pack 1 with the slidable tray 52, the counter advance spring plate or lever 27 incorporated in the chamber 62 pushes the erect surface 28a of the stepping claws 28 on the counter disk 19 through the access opening 18d, to step up the counter disk 19 rotationally. Then the counter numeral "2" comes to appear in the counter indicator window 18c instead of "1". Then the counter advance spring plate 27 is moved back to its initial position.

In the returning movement, the claw end 27a of the counter advance spring plate or lever 27 moves in contact with the guide inclined surface 28b. Consequently the counter advance spring plate 27 can easily move past the stepping claws 28. There is no accidental operation of backward push of the counter advance spring plate 27 to a preceding one of the stepping claws 28. The counter disk 19 is not rotated in reverse by half a step. It is likely that there occur plural kinds of failure, including burrs created with the claw end 27a at the time of cutting out the counter advance spring plate 27 with insufficient precision, failure in precisely bending the counter advance spring plate 27, and failure in precisely positioning the counter advance spring plate 27. However there is no backward rotation of the counter disk 19 even despite any of those kinds of failure.

When the counter disk 19 is stepped rotationally by the counter advance spring plate or lever 27, the bottom end 22d of the push plate 22 is moved up along the inclined surface 25a of the ratchet claws 25, then moved in contact with the flat top, and guided by the auxiliary inclined surface 25c before dropping in next intermediate position between adjacent two of the ratchet claws 25. See FIG. 9. By the virtue of the auxiliary inclined surface 25c, the stepping angle of the counter disk 19 is kept unchanged irrespective of minute differences in the swing amount of the counter advance spring plate 27.

The sheet photo film pack 1 now has the same state as that of FIG. 10 except for the second sheet photo film unit 4b positioned directly under the slidable lid 5. Exposures are taken by repeating the same operation. After the eighth one of the sheet photo film units 4 is exposed, the sheet photo film pack 1 is pulled out and pushed in. The pack housing 3 contains the sheet photo film units 4 all exposed and overlaid as a stack in the order of exposures. The opening 3a is covered by the slidable lid 5. See FIG. 10.

After all the sheet photo film units 4 in the sheet photo film pack 1 are exposed, the push plate 22 comes to the top of the ratchet claw 26 and contacts the projection 26a. The counter disk 19, therefore, is inhibited from being rotated any more. The end sign E is indicated in the counter indicator window 18c to give information of unavailability of unexposed photo film unit. A top end 22c of the push plate 22 is engaged with a retainer hole 5f of the slidable lid 5 through an opening 24d, to retain the slidable lid 5 to the pack housing 3. The housing cover 51 is unlocked. The housing cover 51 is opened by operation of the knob 61.

The housing cover 51 being swung, the projections 12c and 12d are released from being pressed by the projections 58a and 58b. The fastener 12 is moved up to engage the claws 12a and 12b with the retainer holes 5c and 5d, to connect the cap 2 with the slidable lid 5. As the ridge 5e of the slidable lid 5 is engaged with the end of the pack housing 3, the cap 2 is retained on the pack housing 3. The cap 2 is released from being pressed by the ridge 57. The sheet photo film pack 1 being used can be removed from the pack holder 10.

Figure 14:
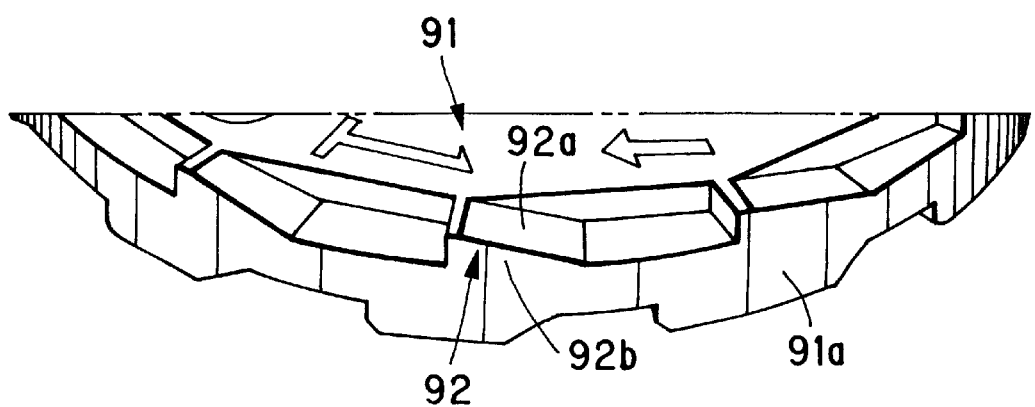
FIG. 14 is a perspective, partially cutaway, illustrating another preferred counter disk.

In the above embodiment, the outer surface of the stepping claws 28 is inclined with reference to the circumferential surface of the counter disk 19. The stepping claws 28 has a gear shape as viewed from the first face 19c of the counter disk 19. Alternatively a construction of FIG. 14 can be used, in which a counter disk 91 includes stepping claws 92 or teeth, of which an outer portion 92b outside a guide inclined surface 92a is included in a circumferential surface 91a of the counter disk 91 in a manner of a "crown gear".

In the above embodiment, the spring portion 22a is included in the single piece of the push plate 22. The piece is formed from thermoplastic resin. This is advantageous in small cost for raw material and manufacturing operation. However the spring portion 22a is likely to be degraded in its bias force with time, for example after preservation for a long time. In view of this, another preferred embodiment is described, in which a metal coil spring is used which is unlikely to be degraded with time.

Figure 15:
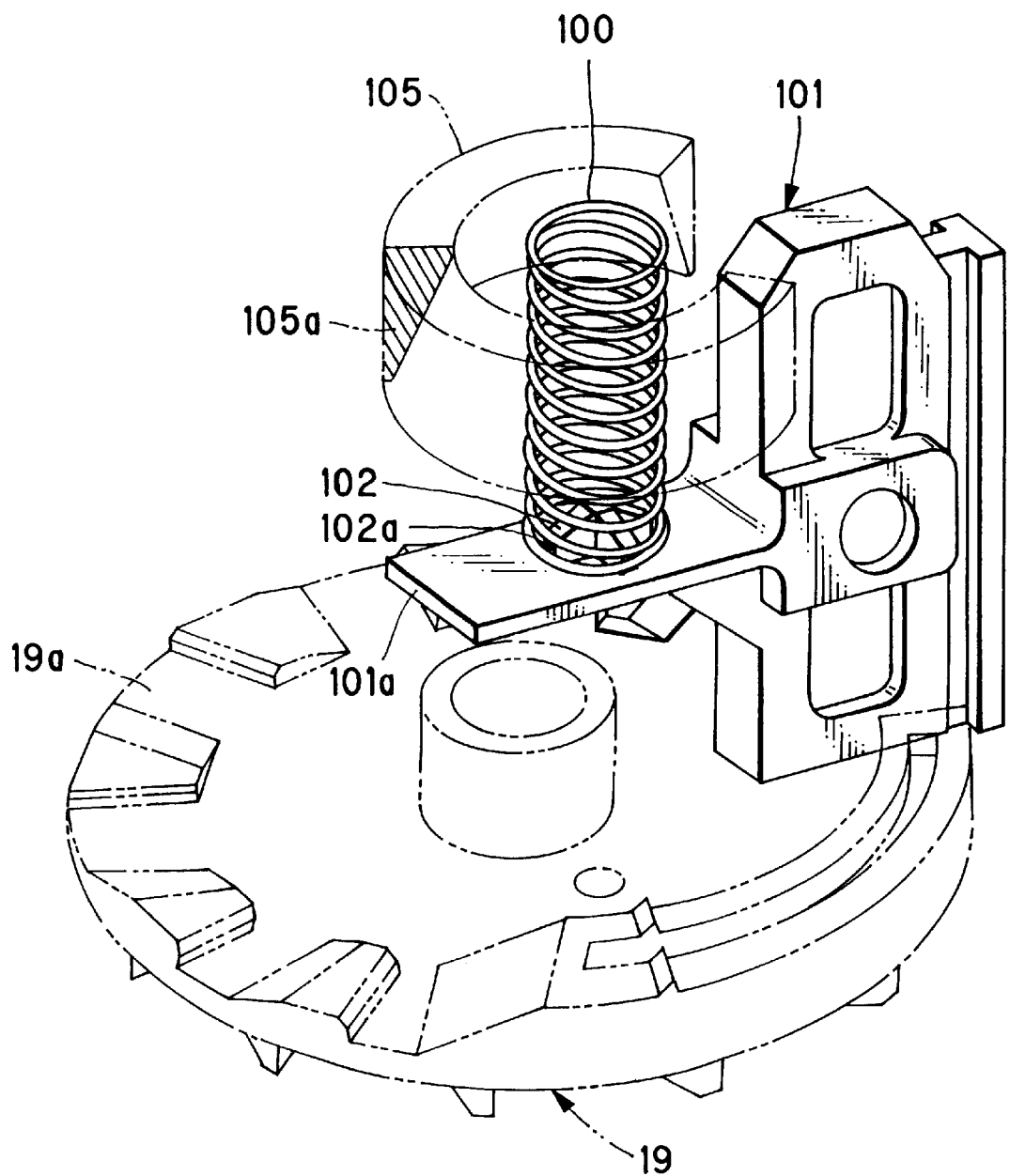
FIG. 15 is a perspective illustrating another preferred push plate which is combined with a coil spring.

In FIG. 15, a push plate 101 of a ratchet mechanism has a flat support portion 101a, which projects vertically to the moving direction of the push plate 101. The flat support portion 101a receives a metal spring 100. A retainer projection 102 is formed integrally with the top of the flat support portion 101a in such a shape that the metal spring 100 is lightly pushed to the retainer projection 102 to be retained thereto. The retainer projection 102 has a cross shape including four segments, each of which has a subsidiary projection 102a of a small size. When an end of the metal spring 100 is pushed to the retainer projection 102, one turn of the metal spring 100 is captured by the subsidiary projection 102a to secure the metal spring 100 to the retainer projection 102.

In combination with the push plate 101 having the coil spring, a ring-shaped ridge 105 is formed on the rear of the cover plate 24 at its center. The ring-shaped ridge 105 has a sector shape of 270 degrees without a range of the remaining 90 degrees, for the purpose of keeping a vertically moving path of the push plate 101. A shape 105a of the ring-shaped ridge 105 viewed in cross section is triangular, and has a thick foot and a thin end. Consequently the shape 105a makes it possible to guide the top of the metal spring 100 to the center of the ring-shaped ridge 105 even when the engagement between the metal spring 100 and the retainer projection 102 becomes less tight due to irregularities in the size of molding the push plate 101. The orientation of the metal spring 100 is corrected even if an inclination occurs in the metal spring 100 with reference to the top face of the flat support portion 101a.

Note that a U-shaped spring may be used instead of the metal spring 100. Also the retainer projection 102 for retaining the metal spring 100 may be formed on the rear of the cover plate 24.

The bias force applied by the metal spring 100 to the push plate 101 to push the counter disk 19 while the number of the exposures is indicated is in a range of 20–400 gf on the condition of the metal spring 100 having the compressed length of 6 mm in an ordinary state of the use. When the sheet photo film pack is handled roughly or subjected to a considerable shock, the stop position of the counter disk 19, and thus the indicated numeral, is offset if the metal spring 100 is not strong. This is because the inertia in the rotation of the counter disk 19 operates beyond the force of the metal spring 100. Should the force of the metal spring 100 be too great, there occurs great resistance specially during the rotating operation to the end sign E. Accordingly it is concluded that bias force of the metal spring 100 is in a preferable range of 120–350 gf, and in a desirable range of 150–300 gf.

Figure 16:
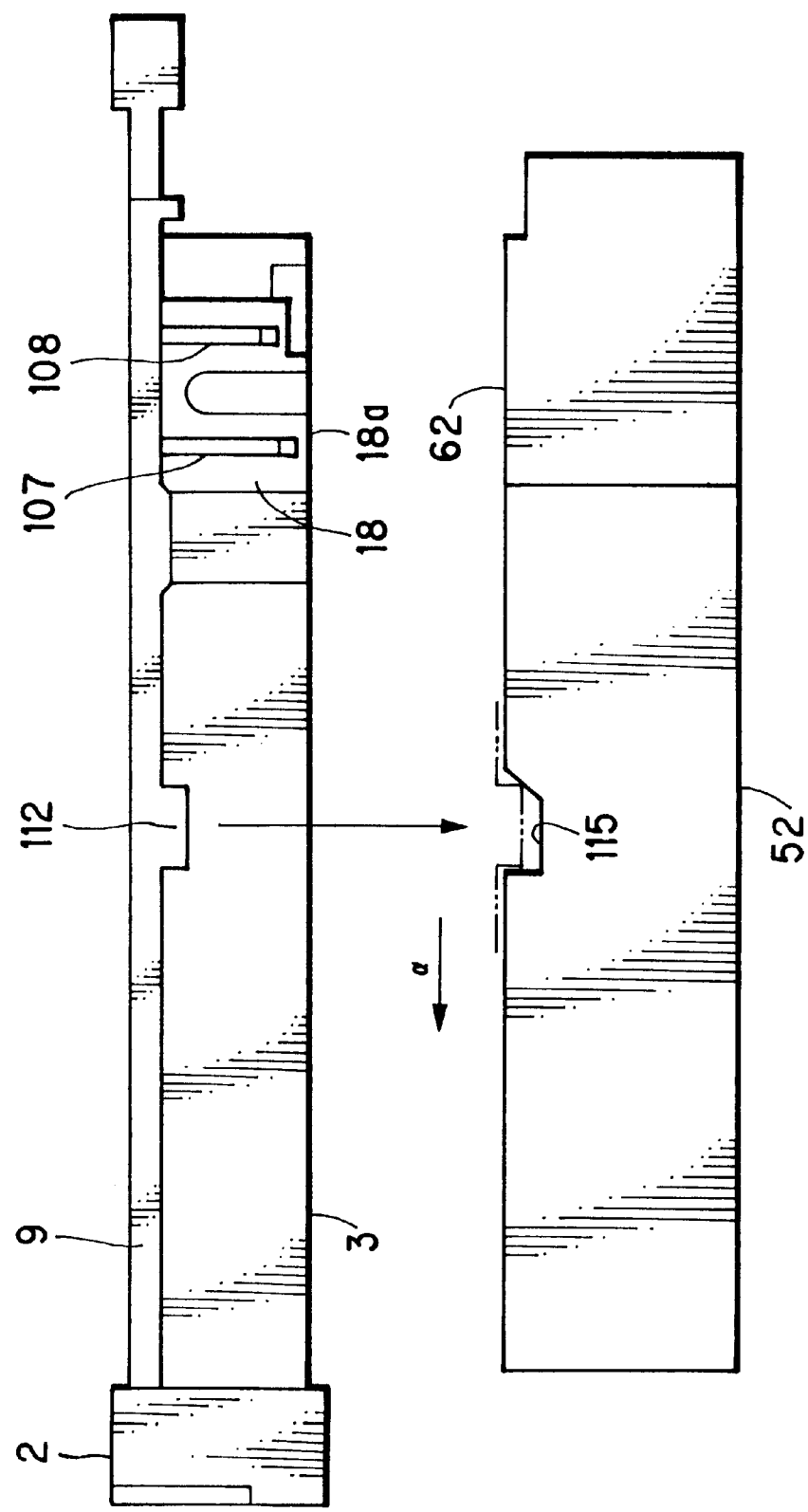
FIG. 16 is a side elevation illustrating still another preferred embodiment in which each of the sheet photo film pack and the pack holder includes engageable portions.
Figure 17:
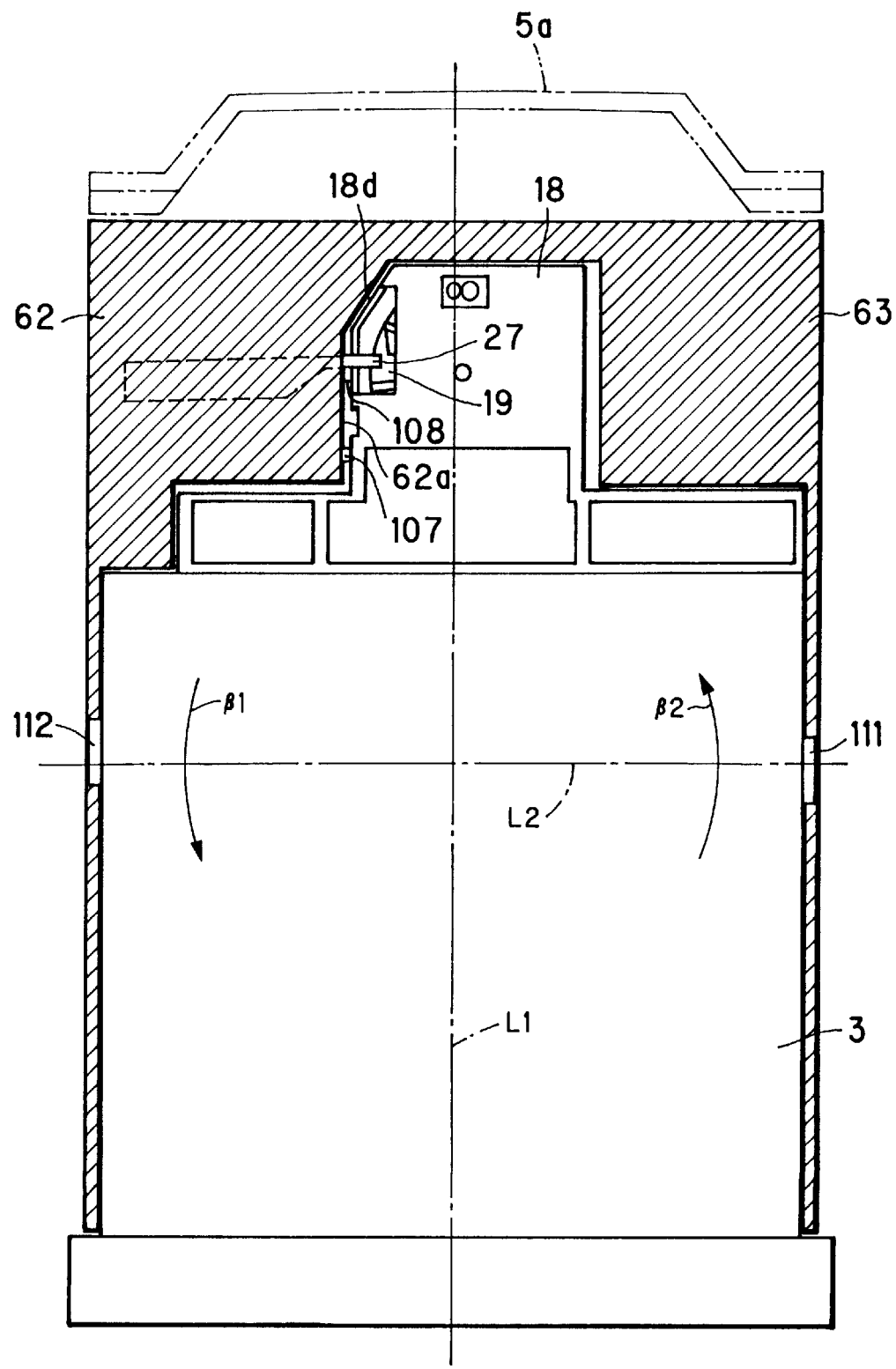
FIG. 17 is a bottom plan illustrating the sheet photo film pack with the pack holder.

To stabilize the stepping operation of the counter disk, it is important to keep the distance between the counter disk claws and the advance spring plate or lever within a suitable range. In FIGS. 16 and 17, ridges 107 and 108 are formed on an outer wall of the counter chamber 18 near to the access opening 18d. The ridges 107 and 108 extend vertically to the bottom wall 18a. Engaging portions 111 and 112 are disposed respectively under the guide rails 8 and 9, and in an asymmetric manner with respect to a center line L1 of the pack housing 3 crosswise to a shorter side of the pack housing 3. In the present embodiment, the engaging portions 111 and 112 lie on a center line L2 of the pack housing 3 crosswise to a longer side of the pack housing 3, but are offset in the longitudinal direction of the pack housing 3. See FIG. 17. Edges of the slidable tray 52 have receiving portions 114 and 115, which correspond to the engaging portions 111 and 112.

The receiving portion 115 has an inclined edge located closer to the chamber 62. The receiving portion 115, when receiving the engaging portion 112, operates to shift the pack housing 3 in the arrow direction α which is away from the chamber 62. The receiving portion 114 has an inclined edge located opposite to that of the receiving portion 115. The receiving portion 114, when receiving the engaging portion 111, operates to shift the pack housing 3 in a direction opposite to the arrow direction α. The engaging portions 111 and 112 are asymmetrical to each other with respect to the center line L1. When the pack housing 3 is inserted in the slidable tray 52, the pack housing 3 is rotated in the arrow directions β1 and β2 of FIG. 17. The ridges 107 and 108 are pressed against the chamber 62. Even if there is a play between the pack housing 3 and the slidable tray 52, the distance from the counter disk 19 to the counter advance spring plate or lever 27 is kept constant. In the present embodiment, the pack housing is provided with the projections. The slidable tray is provided with the recesses. Alternatively the pack housing may be provided with recesses, and the slidable tray may be provided with projections.

Figure 18:
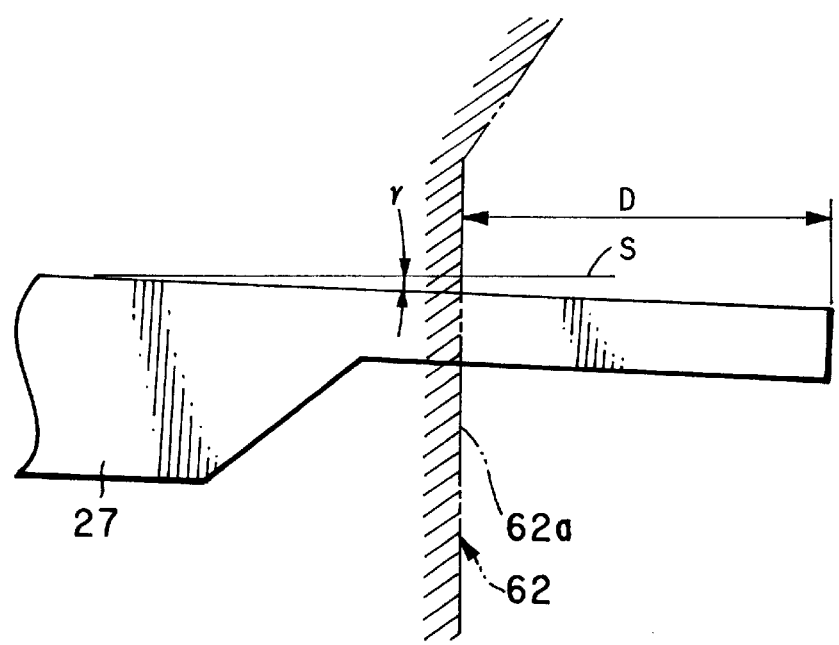
FIG. 18 is an explanatory view in plan, illustrating a claw end of the counter advance spring plate.

In FIG. 18 depicting the end of the counter advance spring plate or lever 27 in enlargement, let be an inclination angle of the counter advance spring plate 27 with reference to a line S perpendicular to a lateral face 62a of the chamber 62. Let D be a claw projecting length with which the counter advance spring plate 27 projects over the lateral face 62a in the direction of the line S while is 2.57 degrees. Experiments were conducted to find relationships between the claw projection length D, the counter stepping and the counter back-stepping, as indicated in TABLE 2.

Figure 27:
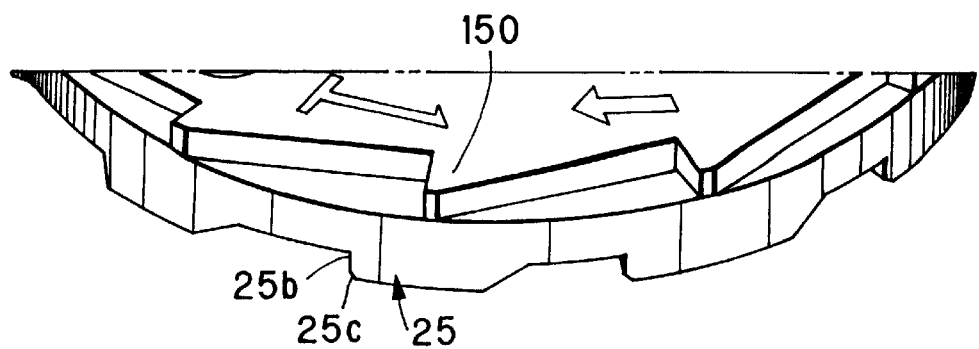
FIG. 27 is a perspective, partially cutaway, illustrating a counter disk in accordance with a comparative example.

The term "counter back-stepping" is used to mean a state in which the claw end 27a of the counter advance spring plate or lever 27 when moved back to its initial position is contacted by one of the stepping claws to cause erroneous rotation in reverse to the normal stepping direction. In TABLE 2, the Shape I is related to stepping claws 150 or teeth of a comparative example as illustrated in FIG. 27. The Shape II is related to the stepping claws 28 of FIG. 6. The Shape III is related to the stepping claws 92 of FIG. 14. The signs A, B, C, D and E respectively represent "Excellent", "Good", "Usable", "Unreliable and requiring a change" and "Unusable". For the counter back-stepping, a higher one of the grades is provided according to the smallness of the counter back-stepping. For example, the sign E means inevitable occurrence of the counter back-stepping.

TABLE 2

| Claw pro-jecting length D | Shape I of claws 150 (Comparative ex.) | | Shapes II & III of claws 28 & 92 | |
|---|---|---|---|---|
| | Counter stepping | Counter back-stepping | Counter stepping | Counter back-stepping |
| 4.60 mm | E | A | E | A |
| 4.70 mm | D | A | D | A |
| 4.80 mm | C | A | C | A |
| 4.90 mm | B | B | B | B |
| 5.00 mm | B | B | B | B |
| 5.10 mm | B | B | B | B |
| 5.20 mm | B | B | B | B |
| 5.30 mm | B | C | B | B |
| 5.40 mm | A | D | A | B |
| 5.50 mm | A | E | A | C |
| 5.60 mm | A | E | A | D |
| 5.70 mm | A | E | A | E |

As is observed in TABLE 2, the claw projecting length D for the shape I is preferably in a range of 4.8–5.3 mm, more preferably in a range of 4.9–5.2 mm, and desirably in a range of 5.0–5.1 mm. The shapes II and III with the improvements can have a larger tolerable range of the claw projection length D. It is possible to set the length D in a preferable range of 4.8–5.5 mm, in a more preferable range of 4.9–5.4 mm, and in a desirable range of 5.0–5.3 mm. In a preferred aspect of the present invention, the stepping claws of the shape III can be used. The claw projecting length D can be 5.1–5.3 mm. The central value of the claw projecting length D can be determined 5.2 mm in the course of assembly operation.

In the above embodiments, the counter indicator window 18c is used for indication. However a greater opening may be used for appearance of a part of the disk, in combination with which a pointer indicia or index indicia may be used.

In the above embodiment, the eleven stepping claws 28 are used. Alternatively another number of stepping claws may be used, and can be nine or more. Of course the rotational pitch of the stepping claws 28 is equal to that of the counter numerals 1–8 and E and that of the ratchet claws 25.

In one aspect of the present invention, the ratchet claws 25 have the auxiliary inclined surface 25c. It is possible in the present invention that a counter disk having the stepping claws 150 of FIG. 27 is provided with the ratchet claws 25 having the auxiliary inclined surface 25c in the face opposite to the stepping claws 150.

In another aspect of the present invention, the metal spring 100 of FIG. 15 is used. It is possible in the present invention that a counter disk having the stepping claws 150 of FIG. 27 is combined with the push plate 101 and the metal spring 100.

Figure 19:
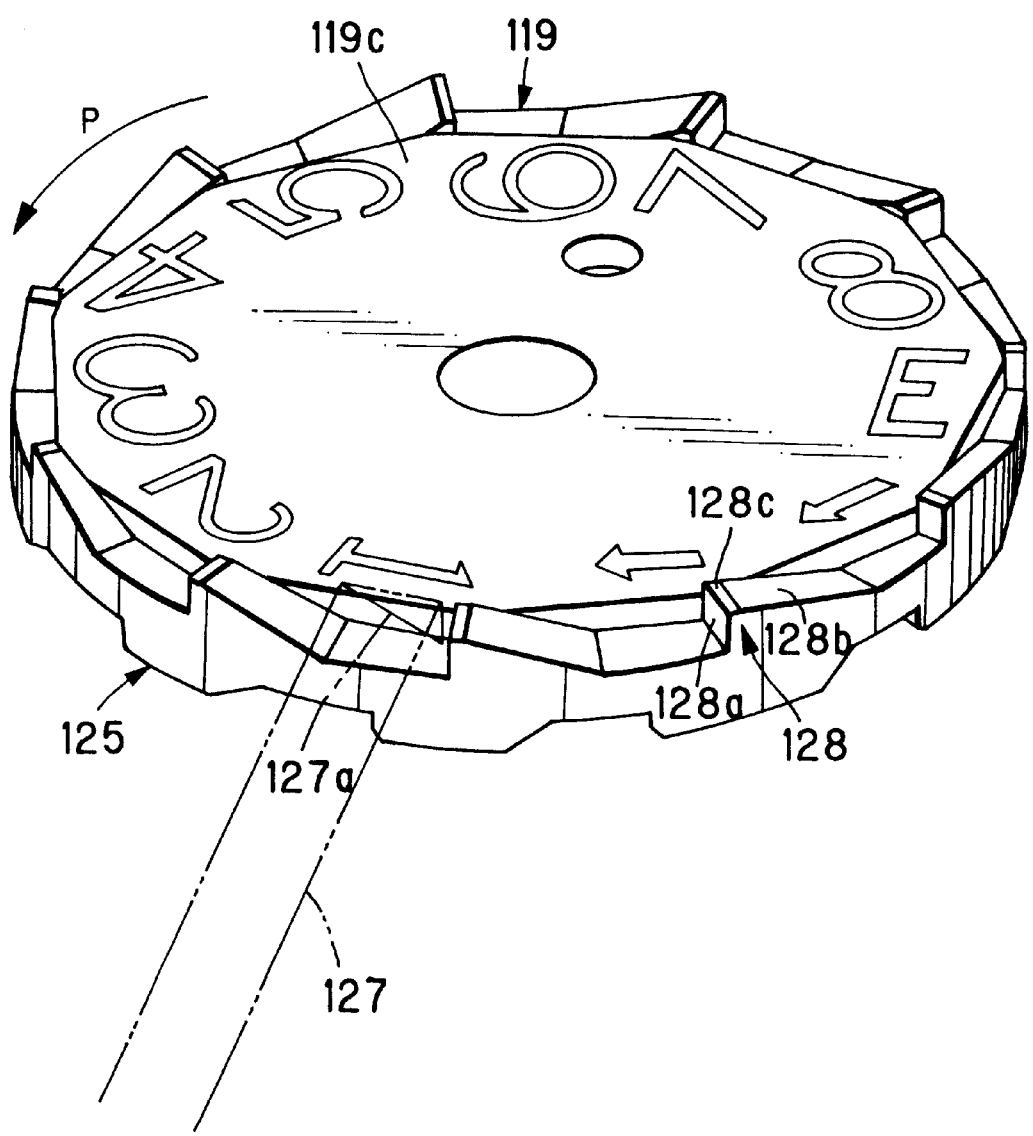
FIG. 19 is a perspective illustrating still another preferred counter disk.

Referring to FIGS. 19–26, still another preferred embodiment is described, in which the tightness in engagement of the counter disk claws with the advance spring plate or lever is increased. A counter disk 119 of FIGS. 19 and 20 is contained in a counter chamber 118 of FIG. 21. There are holes 118h, 118i and 118j respectively at corners of the counter chamber 118. A cover plate has three projections which are formed with its corners, and received in the holes 118h, 118i and 118j, to secure the cover plate to an open face 118g of the counter chamber 118.

Figure 22:
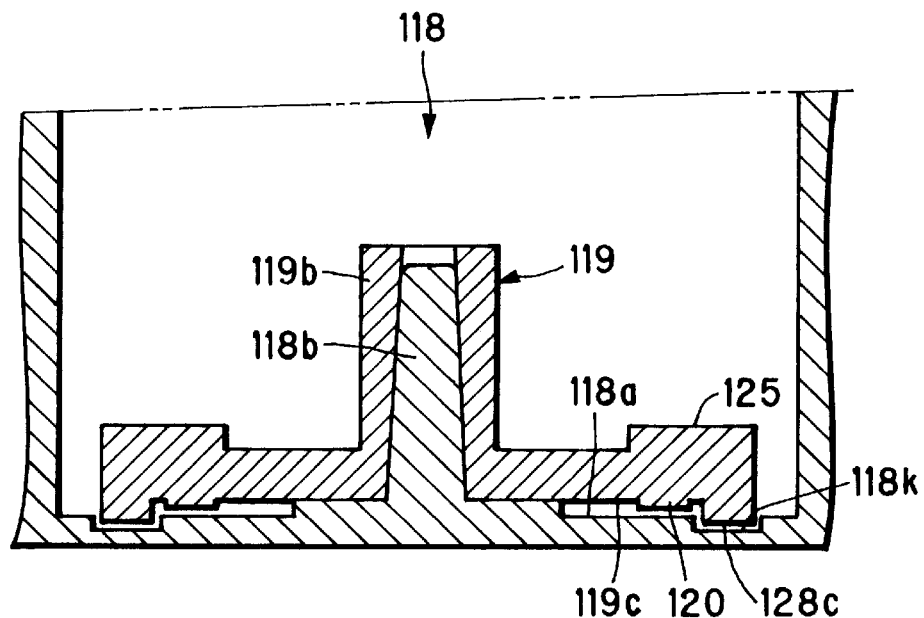
FIG. 22 is a cross section, partially cutaway, illustrating the counter disk and the counter chamber.
Figure 23:
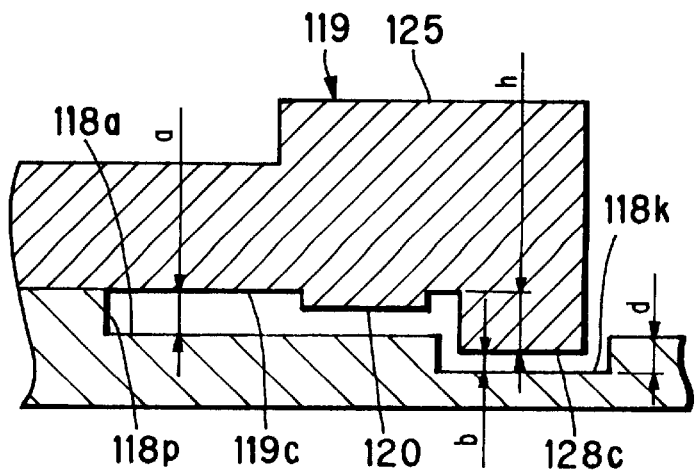
FIG. 23 is a cross section, partially cutaway, illustrating the same as FIG. 22 in enlargement.

Each of stepping claws 128 or teeth is provided with an erect surface 128a and a guide inclined surface 128b. The erect surface 128a is pushed by a counter advance spring plate or lever 127 having a claw. The guide inclined surface 128b is inclined with respect to the thickness direction of the counter disk 119, and has a level coming lower in the stepping direction P. A claw top 128c of the stepping claws 128 protrudes over a level of a first face 119c in the thickness direction. In FIGS. 21, 22 and 23, a bottom wall 118a of the counter chamber 118 is provided with a ring-shaped groove 118k, which is concentric with a shaft 118b, and receives the claw top 128c of the stepping claws 128.

It is possible to keep the engaging amount sufficient between a claw end 127a having the claw of the counter advance spring plate or lever 127 and the erect surface 128a of the stepping claws 128. Even if there is smallness in precision in the manufacture of the counter advance spring plate 127 or failure in assembly of the counter advance spring plate 127, the claw end 127a of the counter advance spring plate 127 can be engaged with the erect surface 128a reliably each time when the counter advance spring plate 127 of the pack holder swings upon sliding the slidable lid after taking an exposure. The counter disk 119 therefore is stepped up accurately by one step.

In FIG. 21, let D1 be a length of the counter chamber 118 in the lid sliding direction inclusive of a width of a groove 118n, which is formed on the periphery of the open face 118g for receiving the cover plate. D1 is determined as 24.7 mm. Let D2 be a distance between centers of the holes 118i and 118j. D2 is determined as 19.7 mm. Let D3 be a distance between centers of the hole 118i and the shaft 118b in the width direction of the slidable lid. Let D4 be a distance between centers of the hole 118h and the shaft 118b in the width direction of the slidable lid. In the present embodiment, D3=9.95 mm and D4=11 mm. Let D5 be a distance from the center of the shaft 118b to a first corner of the counter chamber 118 inclusive of the width of the groove 118n in the lid width direction. Let D6 be a distance from the center of the shaft 118b to a second corner of the counter chamber 118 inclusive of the width of the groove 118n in the lid width direction. In the present embodiment, D5=12.3 mm and D6=13.2 mm. Let a be an inner diameter of the ring-shaped groove 118k. Let β be an outer diameter of the ring-shaped groove 118k. In the present embodiment, α=18.2 mm and β=23.6 mm.

In FIG. 23, the bottom wall 118a has an indicia projection 120, with which each of the counter numerals 1, 2, 3, ..., 8 and the end sign E is formed. There is a washer-shaped projection 118p, formed close to the shaft 118b of the counter chamber 118, for preventing the indicia projection 120 from being rubbed on the bottom wall 118a. Let a be a height of the washer-shaped projection 118p. a is determined as 0.2 mm. Let h be a projecting amount at which the claw top 128c of the stepping claws 128 projects over the first face 119c. Should the projecting amount h be set great, the engaging amount with the counter advance spring plate or lever 127 is increased to enable the counter disk 119 to be stepped stably. However a groove depth d of the ring-shaped groove 118k is the greater. The thickness of the bottom wall 118a is the smaller, so that flow of resin becomes the less smooth in the course of molding the pack housing. There occurs a problem of insufficient moldability. If in turn the projecting amount h should be set small, then there occurs a problem of failure in stepping operation of the counter disk 119. Experiments were conducted with changes in the groove depth d and the projecting amount h, to find results of the steppability of the counter disk 119 and the moldability, as indicated in TABLE 3. Note that a distance b between the claw top 128c of the stepping claws 128 and the bottom of the ring-shaped groove 118k was determined 0.1 mm in an unchanged manner. In TABLE 3, the signs A, B, C, D and E respectively represent "Excellent", "Good", "Usable", "Unreliable and requiring a change" and "Unusable".

TABLE 3

| Projecting length h of claw 128 | Depth d of groove 118k | Steppability | Moldability |
|---|---|---|---|
| 0.00 mm | 0.00 mm | E | A |
| 0.10 mm | 0.00 mm | D | A |
| 0.15 mm | 0.05 mm | C | A |
| 0.20 mm | 0.10 mm | B | B |
| 0.25 mm | 0.15 mm | B | B |
| 0.30 mm | 0.20 mm | B | B |
| 0.35 mm | 0.25 mm | B | B |
| 0.40 mm | 0.30 mm | B | B |
| 0.45 mm | 0.35 mm | A | C |
| 0.50 mm | 0.40 mm | A | D |
| 0.60 mm | 0.50 mm | A | E |

In conclusion of observing the results of TABLE 3, the height h of the stepping claws 128 is in a preferable range of 0.15–0.45 mm, in a more preferable range of 0.20–0.40 mm, and in a desirable range of 0.25–0.35 mm. In the present embodiment, h is determined as 0.30 mm. A depth d of the ring-shaped groove 118k is determined as 0.30 mm.

In operation, the claw end 127a of the counter advance spring plate or lever 127 is engaged with the erect surface 128a of the stepping claws 128 with high reliability even occurrence of low precision in manufacturing the counter advance spring plate 127 or assembly of the same. The claw top 128c of the stepping claws 128 effectively has the level projecting over the first face 119c.

Reference numeral 118 c designates a counter indicator window. Also the counter chamber 118 includes an access opening 118d and a guide groove 118f. The counter disk 119 includes a second face 119a and a sleeve 119b. A push plate 122 as ratchet mechanism includes a spring portion 122a, a bias end 122b, a top end 122c and a bottom end 122d. Ratchet claws 125 or anti-reversal teeth include an inclined surface 125a and an auxiliary inclined surface 125c. A ratchet claw 126 or tooth has a projection 126a.

Figure 24:
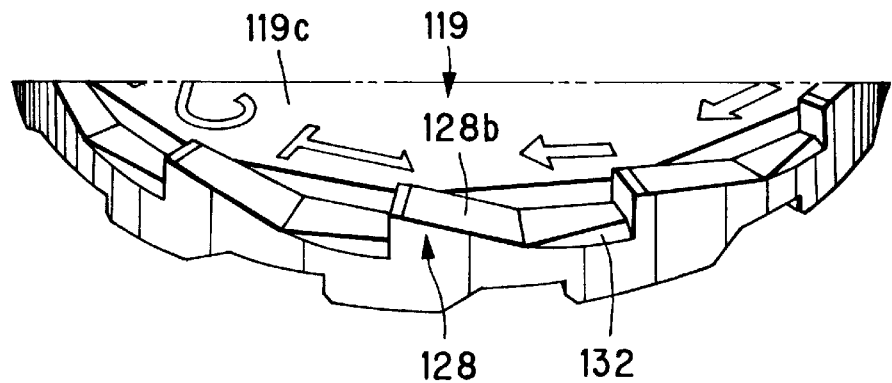
FIG. 24 is a perspective, partially cutaway, illustrating another preferred counter disk.

In FIG. 24, a further preferred embodiment is illustrated, in which an additional inclined surface 132 is formed between adjacent two of the stepping claws 128 of the counter disk 119 for the purpose of guiding the advance spring plate or lever. The additional inclined surface 132 communicates with the guide inclined surface 128b only at a point. There is no step between the guide inclined surface 128b and the additional inclined surface 132. The additional inclined surface 132 being formed, the claw end 127a of the counter advance spring plate 127 is prevented from being captured in contact with the circumferential portion between the stepping claws 128 in the course of return of the counter advance spring plate 127 to its initial position even when the position of the counter advance spring plate 127 is offset in the longitudinal direction of the counter advance spring plate 127.

Figure 25:
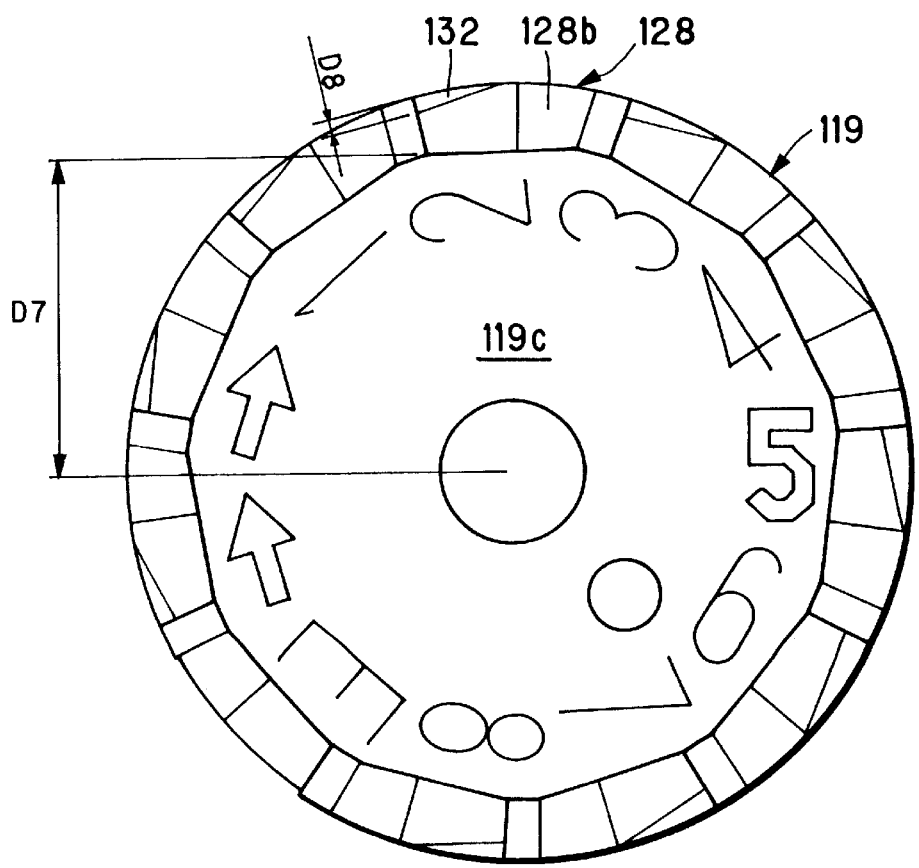
FIG. 25 is a plan illustrating the counter disk.
Figure 26:
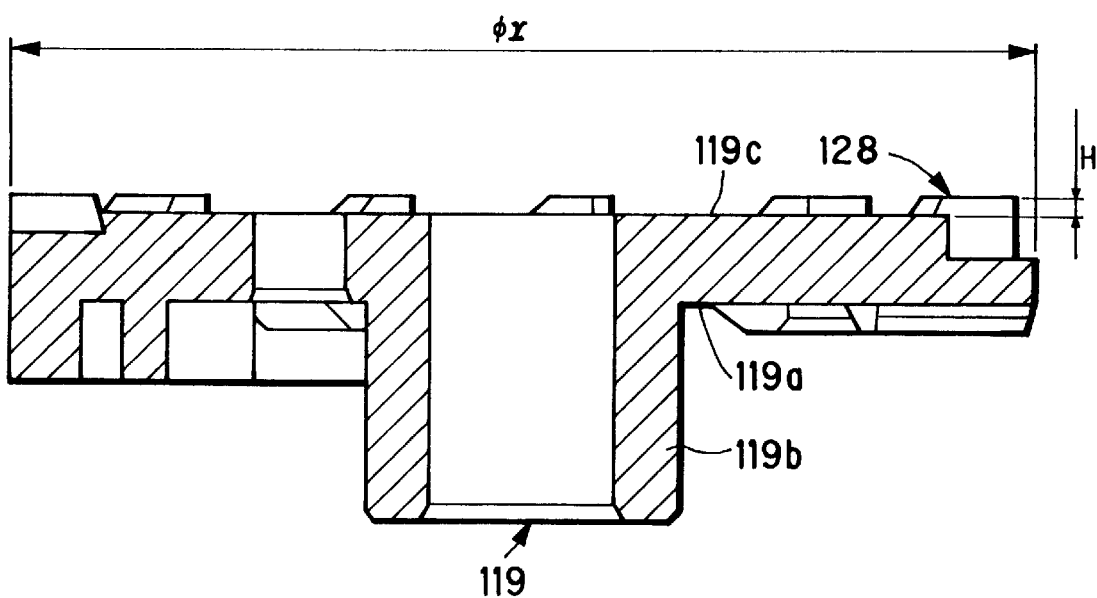
FIG. 26 is a cross section illustrating the counter disk.

In FIG. 25, let D7 be an interval between a center of the counter disk 119 and the stepping claws 128. Let D8 be the maximum of a width of the additional inclined surface 132. In the present embodiment, D7=9.42 mm and D8=0.5 mm. In FIG. 26, let be a diameter of the counter disk 119. Let H be a height of the stepping claws 128 over the first face 119c. In the present embodiment, =23 +0.1 mm, and H=0.3 mm.

As described above, the shape of the counter disk 119 has numerous projections or recesses, including the claw top 128c protruding at 0.3 mm over the first face 119c. Extremely high precision is required for molding the counter disk 119. In molding of resin, deformation called "molding strain" is likely to occur due to differences in the shrinkability between portions with different thicknesses in the course of drop of temperature. It is therefore preferable to subject the counter disk 119 as a resin product to the annealing process in which the product after being molded is cooled at an extremely low speed.

Also residual strain may occur in the molded product after being molded. To remove the residual strain quickly, it is also possible to utilize a technique in which the molded product is heated again, for example at 80° C. for 1–2 hours, and then cooled gradually down to the room temperature. In the sheet photo film pack of the present embodiment, this technique is used in the cap, the fastener, and the push plate 122.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A counter device for a sheet photo film pack, said sheet photo film pack including a pack housing for containing a stack of plural sheet photo film units, said counter device comprising:

a counter chamber formed in said pack housing;

a counter disk, contained in said counter chamber in a rotatable manner, and having first and second faces;

a train of counter numerals arranged on said first face in an arc-shaped manner at a predetermined pitch;

plural stepping claws, disposed on said first face to project in a thickness direction of said counter disk, arranged in an arc-shaped manner at said predetermined pitch, and rotationally shifted by an external mechanical shift signal in a predetermined stepping direction, for setting each one of said counter numerals in a predetermined index position adapted to indicate a number of one of exposed and unexposed ones of said sheet photo film units;

an erect surface, formed on each one of said stepping claws, positioned thereon backwards to said stepping direction, erect in said thickness direction of said counter disk, and pushed in said stepping direction by a portion of an external counter advance mechanism, for receiving said shift signal;

a guide inclined surface, formed on each one of said stepping claws, positioned thereon in said stepping direction, and inclined with reference to said thickness direction of said counter disk, for guiding said portion of said counter advance mechanism moved in reverse to said stepping direction, to allow engaging said portion with said erect surface upon passing said stepping claws;

wherein said sheet photo film pack is used with a pack holder, and said pack holder includes:

a holder housing for containing said sheet photo film pack; and said counter advance mechanism, disposed in said holder housing, and actuated in response to an operation associated with use of each one of said sheet photo film units, for generating said shift signal;

wherein said portion of said counter advance mechanism is a spring plate, said spring plate includes a bend end engageable with said stepping claws, said bend end has an inclined side extended with an inclination consistent with said guide inclined surface, and said spring plate moves back and forth for one time for rotating said counter disk by said predetermined pitch; and a ratchet mechanism for preventing said counter disk from rotating in reverse to said stepping direction when said counter numerals are set in said index position;

wherein said ratchet mechanism includes:

plural ratchet claws, disposed on said second face to project from said counter disk, and arranged in an arc-shaped manner at said predetermined pitch; and a push plate, disposed in said counter chamber in a movable manner, confronted with said second face, for blocking rotation of said ratchet claws in reverse to said stepping direction.

2. A counter device as defined in claim 1, further comprising an additional inclined surface, extended crosswise to said thickness direction, formed on each one of said stepping claws, and inclined to decrease a radius of said stepping claws in said stepping direction, said radius being defined with reference to a center of said counter disk.

3. A counter device as defined in claim 1, wherein said stepping claws have a circumferential surface which is extended crosswise to said thickness direction, and of which a radius is constant with reference to a center of said counter disk.

4. A counter device as defined in claim 1, further comprising:

a numeral indication portion, disposed on said first face, and having said counter numerals arranged thereon; and a peripheral portion, disposed about said numeral indication portion on said first face, recessed from said numeral indication portion, and having said stepping claws arranged thereon;

wherein said stepping claws have a top point disposed to reach said numeral indication portion.

5. A counter device as defined in claim 1, wherein said sheet photo film pack further includes an engaging portion, disposed on said pack housing, and shaped in an asymmetrical manner with respect to a center line of said pack housing;

said pack holder includes:

a slidable tray, disposed in a manner slidable into and out of said holder housing, for containing said sheet photo film pack; and a receiving portion, disposed in said slidable tray, engaged with said engaging portion, for positioning said sheet photo film pack in said slidable tray, to tighten engagement between said counter disk and said spring plate of said counter advance mechanism.

6. A counter device as defined in claim 5, wherein said sheet photo film pack further includes first and second guide rails, disposed to project laterally from said pack housing with reference to a slide direction of said slidable tray, and extended in said slide direction;

said engaging portion includes first and second projections, disposed to project downwards respectively from said first and second guide rails;

said receiving portion includes first and second recesses, formed respectively in first and second edges, said first and second edges being disposed on an upper face of said holder housing, arranged laterally with reference to said slide direction, and extended in said slide direction.

7. A counter device as defined in claim 6, wherein said pack holder further includes an inclined surface, formed on one end of said at least one of said first and second recesses, inclined with reference to a confronting direction between said pack housing and said slidable tray, for guiding said at least one of said first and second projections toward said at least one of said first and second recesses.

8. A counter device as defined in claim 1, further comprising an access opening, formed through a bottom wall of said counter chamber confronted with said first face, and adapted to engagement between said stepping claws and said spring plate of said counter advance mechanism therethrough.

9. A counter device as defined in claim 8, wherein said pack holder further includes:

a slidable tray, mounted in said holder housing, for said sheet photo film pack, said slidable tray being slid in a first direction to come out of said holder housing, and slid in a second direction to come into said holder housing;

an exposure opening formed in said holder housing, for receiving an exposure surface of a first one of said plural sheet photo film units, said exposure opening being adapted to exposure of said first sheet photo film unit;

a shifter mechanism for shifting said first sheet photo film unit away from said exposure opening in response to a slide of said slidable tray and said sheet photo film pack in said first direction after said exposure, then said slidable tray and said sheet photo film pack being slid in said second direction, said exposure opening receiving a second one of said plural sheet photo film units next to said first sheet photo film unit;

wherein said spring plate of said counter advance mechanism outputs said shift signal by moving back and forth for one time in response to a back-and-forth slide of said slidable tray and said sheet photo film pack.

10. A counter device as defined in claim 9, wherein said spring plate of said counter advance mechanism is moved from an initial position to a ready position in response to a slide of said slidable tray and said sheet photo film pack in said first direction, and is moved from said ready position to said initial position in response to a slide of said slidable tray and said sheet photo film pack in said second direction so as to move back and forth for one time.

11. A counter device as defined in claim 10, wherein said counter advance mechanism further includes a pin, disposed in said holder housing, for moving in response to said slide of said slidable tray and said sheet photo film pack in said second direction;

said spring plate, having first and second ends, said first end being engaged with said pin, said second end being engaged with said stepping claws, said spring plate rotating in response to movement of said pin, said second end outputting said shift signal.

12. A counter device as defined in claim 1, further comprising:

a ratchet erect surface, formed on each one of said ratchet claws, positioned thereon backwards to said stepping direction, erect in said thickness direction of said counter disk; and an auxiliary inclined surface, formed on each one of said ratchet claws by chamfering an edge of said ratchet erect surface, for guiding movement of said push plate toward said ratchet erect surface during rotation of said counter disk in said stepping direction.

13. A counter device as defined in claim 12, further comprising an inclined surface, formed on each one of said ratchet claws, positioned thereon in said stepping direction, inclined with reference to said thickness direction of said counter disk, for guiding said push plate to be relatively passed thereby while rotated in said stepping direction.

14. A counter device as defined in claim 13, further comprising a bias mechanism for pressing said push plate against said second face.

15. A counter device as defined in claim 14, wherein said counter chamber has one open face with which said second face is confronted;

further comprising a cover plate for closing said open face;

wherein said bias mechanism is a resilient spring portion, formed integrally with said push plate, extended to said cover plate, for biasing said push plate away from said cover plate.

16. A counter device as defined in claim 1, further comprising a metal spring for pressing said push plate against said second face.

17. A counter device as defined in claim 16, wherein said counter chamber has one open face with which said second face is confronted;

further comprising a cover plate for closing said open face;

wherein said metal spring is a coil spring, disposed between said push plate and said cover plate, for biasing said push plate away from said cover plate.

18. A counter device for a sheet photo film pack, said sheet photo film pack including a pack housing for containing a stack of plural sheet photo film units, said counter device comprising:

a counter chamber formed in said pack housing;

a counter disk, contained in said counter chamber, and having first and second faces, there being a train of counter numerals arranged on said first face, said counter disk being rotated by an external mechanical shift signal in a predetermined stepping direction, for setting each one of said counter numerals in a predetermined index position adapted to indicate a number of one of exposed and unexposed ones of said sheet photo film units;

plural ratchet claws, disposed on said second face to project from said counter disk, and arranged in an arc-shaped manner at a predetermined pitch;

a ratchet erect surface, formed on each one of said ratchet claws, positioned thereon backwards to said stepping direction, and erect in said thickness direction of said counter disk;

a push plate, disposed in said counter chamber in a movable manner, confronted with said second face, for contacting said ratchet claws, to prevent said counter disk from rotating in reverse to said stepping direction; and an auxiliary inclined surface, formed on each one of said ratchet claws by chamfering an edge of said ratchet erect surface, for guiding movement of said push plate toward said ratchet erect surface during rotation of said counter disk in said stepping direction.

19. A counter device for a sheet photo film pack, said sheet photo film pack including a pack housing for containing a stack of plural sheet photo film units, said counter device comprising:

a counter chamber formed in said pack housing;

a counter disk, contained in said counter chamber, and having first and second faces, there being a train of counter numerals arranged on said first face, said counter disk being rotated by an external mechanical shift signal in a predetermined stepping direction, for setting each one of said counter numerals in a predetermined index position adapted to indicate a number of one of exposed and unexposed ones of said sheet photo film units;

plural ratchet claws, disposed on said second face to project from said counter disk, and arranged in an arc-shaped manner at a predetermined pitch;

a push plate, disposed in said counter chamber in a movable manner, confronted with said second face, for contacting said ratchet claws, to prevent said counter disk from rotating in reverse to said stepping direction; and a metal spring for pressing said push plate against said second face.

* * * * *

UNITED STATES PATENT AND TRADEMARK OFFICE
CERTIFICATE OF CORRECTION

PATENT NO.   : 6,064,829
DATED        : May 16, 2000
INVENTOR(S)  : Taro Okutsu, Yoshio Hara and Koichi Hatakeyama It is certified that error appears in the above-identified patent and that said Letters Patent is hereby corrected as shown below:

-- Foreign Application Priority Data

| | | | |
|---|---|---|---|
| July 18, 1997 | JP | Japan | 9-193672 |
| March 25, 1998 | JP | Japan | 10-76876 -- |

Signed and Sealed this

Eleventh Day of September, 2001

*Attest:*

*Nicholas P. Godici*

*Attesting Officer*

NICHOLAS P. GODICI
*Acting Director of the United States Patent and Trademark Office*